US012357538B1

(12) United States Patent
Wu et al.

(10) Patent No.: US 12,357,538 B1
(45) Date of Patent: Jul. 15, 2025

(54) VIAL ADAPTER AND INJECTION KIT FOR WITHDRAWING A LIQUID MEDICAMENT FROM AN INJECTION VIAL

(71) Applicant: Genzyme Corporation, Cambridge, MA (US)

(72) Inventors: Haiming Wu, Weston, MA (US); Danial Ferreira, Woodbridge, CT (US)

(73) Assignee: Genzyme Corporation, Cambridge, MA (US)

( * ) Notice: Subject to any disclaimer, the term of this patent is extended or adjusted under 35 U.S.C. 154(b) by 0 days.

(21) Appl. No.: 18/958,648

(22) Filed: Nov. 25, 2024

(51) Int. Cl.
*A61J 1/20* (2006.01)

(52) U.S. Cl.
CPC ............. *A61J 1/201* (2015.05); *A61J 1/2048* (2015.05)

(58) Field of Classification Search
CPC ........ A61J 1/201; A61J 1/2096; A61J 1/2051; A61J 1/2089; A61J 1/2055; A61J 1/2065; A61J 1/2075; A61J 1/1406; A61J 1/1425; A61J 1/1481; A61J 1/2048; A61M 39/1011; A61M 2039/1072; A61M 2039/1016; A61M 2039/1027; A61M 2039/1033; A61M 2039/1044; A61M 2039/1066; A61M 39/10
See application file for complete search history.

(56) References Cited

U.S. PATENT DOCUMENTS 3,977,555 A 8/1976 Larson
4,576,211 A * 3/1986 Valentini ............... A61J 1/2096 604/905
4,872,494 A * 10/1989 Coccia .................. A61J 1/2096 141/369
4,997,430 A 3/1991 Van der Heiden et al.
5,466,220 A 11/1995 Brenneman
5,527,306 A 6/1996 Haining
(Continued)

FOREIGN PATENT DOCUMENTS

JP 2020-116434 A 8/2020
WO WO 2004/058820 A2 7/2004
(Continued)

OTHER PUBLICATIONS

Hamers-Casterman et al., "Naturally occurring antibodies devoid of light chains," Nature, Jun. 3, 1993, 363(6428):446-448.
(Continued)

*Primary Examiner* — Adam Marcetich
(74) *Attorney, Agent, or Firm* — Fish & Richardson P.C.

(57) ABSTRACT

A vial adapter comprises an adapter body comprising a top wall and a sidewall projecting from the top wall in a longitudinal direction to form a receptacle with a distal side of the top wall. The receptacle is configured to receive at least a portion of a barrel head of an injection vial. A movable part comprises a base part and a spike fixed to the base part. The spike extends through the top wall in a distal direction into the receptacle. An actuating member is mechanically coupled to the movable part, and is movable relative to the adapter body from a start position to an end position along a first direction to induce a distally directed displacement of the movable part relative to the adapter body. The mechanical coupling between the movable part and the actuating member is releasable when the actuating member is in the end position.

15 Claims, 6 Drawing Sheets

(56) References Cited

U.S. PATENT DOCUMENTS

| | | | | |
|---|---|---|---|---|
| 6,258,078 | B1 | 7/2001 | Thilly | |
| 6,474,375 | B2 | 11/2002 | Spero et al. | |
| 6,478,788 | B1 * | 11/2002 | Aneas | A61J 1/2096 604/86 |
| 6,558,365 | B2 | 5/2003 | Zinger et al. | |
| 6,656,433 | B2 | 12/2003 | Sasso | |
| 7,326,194 | B2 | 2/2008 | Zinger et al. | |
| 7,896,849 | B2 | 3/2011 | Delay | |
| 8,425,487 | B2 | 4/2013 | Beiriger et al. | |
| 8,562,584 | B2 | 10/2013 | Beiriger et al. | |
| 8,684,992 | B2 | 4/2014 | Sullivan et al. | |
| 9,132,061 | B2 | 9/2015 | Beiriger | |
| 9,339,438 | B2 | 5/2016 | Lev et al. | |
| 9,345,643 | B2 | 5/2016 | Okiyama | |
| 10,159,788 | B2 | 12/2018 | Schriver et al. | |
| 10,420,927 | B2 | 9/2019 | Fangrow | |
| 10,596,068 | B2 | 3/2020 | Okiyama et al. | |
| 10,688,295 | B2 | 6/2020 | Lev et al. | |
| 10,765,604 | B2 | 9/2020 | Denenburg et al. | |
| 10,945,921 | B2 | 3/2021 | Denenburg | |
| 11,642,285 | B2 | 5/2023 | Deneburg et al. | |
| 11,696,871 | B2 | 7/2023 | Seifert et al. | |
| 11,786,443 | B2 | 10/2023 | Lev et al. | |
| 2002/0193777 | A1 * | 12/2002 | Aneas | A61J 1/2096 604/411 |
| 2004/0210207 | A1 * | 10/2004 | Amisar | A61J 1/1487 604/415 |
| 2006/0287638 | A1 * | 12/2006 | Aneas | A61J 1/2096 604/411 |
| 2006/0287639 | A1 | 12/2006 | Sharp | |
| 2008/0177237 | A1 * | 7/2008 | Stonehouse | A61M 5/326 604/263 |
| 2008/0300536 | A1 | 12/2008 | Wang et al. | |
| 2009/0069783 | A1 * | 3/2009 | Ellstrom | A61J 1/2089 604/414 |
| 2010/0241270 | A1 | 9/2010 | Eliuk et al. | |
| 2010/0298806 | A1 | 11/2010 | Yandell | |
| 2011/0087164 | A1 | 4/2011 | Mosler et al. | |
| 2013/0144246 | A1 * | 6/2013 | Takemoto | A61M 39/1011 604/403 |
| 2013/0172818 | A1 | 7/2013 | Schraga | |
| 2013/0340891 | A1 | 12/2013 | Steube | |
| 2014/0230952 | A1 | 8/2014 | Higuchi et al. | |
| 2015/0020919 | A1 | 1/2015 | Wu et al. | |
| 2015/0126958 | A1 * | 5/2015 | Sanders | A61M 39/10 285/330 |
| 2016/0000653 | A1 * | 1/2016 | Kramer | A61J 1/201 604/411 |
| 2016/0296420 | A1 | 10/2016 | Salimnia | |
| 2018/0036203 | A1 * | 2/2018 | Zelinski | A61J 1/2096 |
| 2018/0344571 | A1 * | 12/2018 | Cowan | A61J 1/201 |
| 2019/0175450 | A1 * | 6/2019 | Aneas | A61J 1/2096 |
| 2019/0344009 | A1 | 11/2019 | Damiano et al. | |
| 2019/0381237 | A1 | 12/2019 | Desbrosses et al. | |
| 2020/0230026 | A1 * | 7/2020 | Santos | A61J 1/2048 |
| 2020/0282133 | A1 * | 9/2020 | Mason | A61J 1/2006 |
| 2020/0316360 | A1 | 10/2020 | Naygayz | |
| 2021/0154097 | A1 | 5/2021 | McLoughlin et al. | |
| 2021/0228446 | A1 | 7/2021 | Herrmann | |
| 2022/0087902 | A1 | 3/2022 | Hsieh | |
| 2022/0211952 | A1 | 7/2022 | Beguin et al. | |
| 2023/0052165 | A1 | 2/2023 | Bar-El et al. | |
| 2023/0097647 | A1 * | 3/2023 | Berg | A61M 39/10 141/329 |
| 2023/0321344 | A1 * | 10/2023 | Andresen | A61J 1/2051 604/411 |
| 2024/0017049 | A1 | 1/2024 | Vikash et al. | |
| 2025/0107970 | A1 | 4/2025 | Chen et al. | |

FOREIGN PATENT DOCUMENTS

| | | | |
|---|---|---|---|
| WO | WO 2004/068820 | A2 | 8/2004 |
| WO | WO 2005/018629 | A1 | 3/2005 |
| WO | WO 2006/003388 | A2 | 1/2006 |
| WO | WO 2006/030220 | A1 | 3/2006 |
| WO | WO 2007/017868 | A1 | 2/2007 |
| WO | WO 2017/057476 | A1 | 4/2017 |
| WO | WO 2020/208626 | A1 | 10/2020 |
| WO | WO 2024/142545 | A1 | 7/2024 |

OTHER PUBLICATIONS

Holt et al., “Domain antibodies: proteins for therapy,” Trends in Biotechnology, Nov. 2003, 21(11):484-490.

Muyldermans, “Single domain camel antibodies: current status,” Reviews in Molecular Biotechnology, Jun. 2001, 74(4):277-302.

Needle-based injection systems for medical use Requirements and test methods, Part 1: Needle injection systems, ISO 11608-1:2014(E), Third Edition, Switzerland, ISO, Dec. 15, 2014, pp. 1-13.

Ward et al., “Binding activities of a repertoire of single immunoglobulin variable domains secreted from *Escherichia coli*,” Nature, Oct. 1, 1989, 341(6242):544-546.

U.S. Appl. No. 18/666,320, filed May 16, 2024, Haiming Wu.

U.S. Appl. No. 18/958,540, filed Nov. 25, 2024, Haiming Wu.

U.S. Appl. No. 18/958,707, filed Nov. 25, 2024, Haiming Wu.

Westpharma.com [online], “Vial Adapter Transfer Device,” Sep. 25, 2023, retrieved on May 8, 2025, retrieved from URL <https://www.westpharma.com/products/vial-adapter-systems/vented-swabable-syringe-vial-adapters>, 4 pages.

* cited by examiner

VIAL ADAPTER AND INJECTION KIT FOR WITHDRAWING A LIQUID MEDICAMENT FROM AN INJECTION VIAL

TECHNICAL FIELD

The present disclosure relates to the field of vial adapters configured for fastening to an injection vial and for withdrawing a liquid medicament from the injection vial, e.g., by a fluid transfer device, such as a syringe. In a further aspect the disclosure relates to an injection kit comprising an injection vial and a vial adapter as well as to a method of withdrawing a liquid medicament contained in an injection vial by making use of a vial adapter.

BACKGROUND

Patients suffering from certain diseases like, for example, haemophilia or requiring enzyme replacement therapy have to take regular intravenous (IV) infusions. The infusions often have to be mixed and prepared, sometimes to the specific needs of the patient, (and sometimes a short time before drug administration) which may include reconstitution of the drug powder from multiple vials using an exact amount of sterile liquids like water and/or saline. As this preparation process is typically complex and tedious, it is usually performed by a health care professional in a clinic or pharmacy, potentially using lab equipment.

Generally, administering a medicament by way of infusion may require a rather clean or sterile environment. A patient may therefore have to regularly visit an ambulance or health care center.

Self-medication or home-medication for administering a medicament through infusion or injection is and remains quite challenging but is very attractive for patients thereby avoiding problems and circumstances involved in visiting a health care center. With home- or self-medication a patient or user, e.g., intending to establish a vascular access to a patient's body, may be obliged to use only one hand, which might be rather cumbersome and thus challenging.

In addition, it is often required to establish or maintain a clean and/or sterile environment especially in the field of home-medication or self-medication as well as providing of a clean and sterile storage environment for medicaments and medicament containers, medical device accessory and medical devices.

Some medicaments, which are administered by injection or infusion may be provided in a comparatively small container or there may have to be administered a particularly small amount of medicament, which may be highly concentrated. Here, it may be of particular relevance that the entire content of the medicament container, e.g., containing a liquid injectable medicament is completely emptied and is entirely transferred into a fluid transfer device or injection device, such as a syringe.

Some medicaments to be administered by injection or infusion may be provided in a co-called injection vial, either in liquid or powdered form. Such injection vials typically comprise a barrel filled with the medicament either in a liquid or powdered form. The barrel is typically sealed towards an outlet by a pierceable stopper. The pierceable stopper may be fixed to a barrel head, which may also provide a mechanical fastening for a vial adapter.

Vial adapters are widely known in the art and may provide a well-defined fastening to the barrel head of an injection vial. They may comprise a spike to penetrate the pierceable stopper sealing the outlet of the injection barrel. The spike is typically in fluid communication with a connector, e.g., implemented as a standardized connector that may provide a mechanical fastening of an injection device so that the liquid content provided inside the injection vial can be withdrawn by a fluid transfer device or injection device, e.g., by a syringe or the like medicament container connectable to the vial adapter.

With some vial adapters the spike configured to pierce the pierceable stopper of the vial comprises hollow fluid channel with an inlet opening at a tipped end thereof. In use and when the vial adapter is fastened to the injection vial and when the spike has penetrated the pierceable stopper the inlet opening of the fluid channel may be located at a non-neglectable distance from an inside surface of the pierceable stopper. Such distances are difficult to control or to define because they predominately arise from manufacturing, design and/or assembly tolerances of the stopper, of the barrel and/or of the vial adapter. In use and when the medicament is to be withdrawn from the injection vial, the injection vial with the vial adapter attached thereto may be held upside down.

Since the inlet opening of the spike or of the cannula of the vial adapter through which the liquid medicament can be withdrawn from the interior of the injection vial, is located at a longitudinal distance from the inside surface of the pierceable stopper a complete emptying or nearly complete emptying of the injection vial may become quite tricky and cumbersome if not impossible.

Hence, with known solutions of vial adapters a complete or nearly complete withdrawal and/or emptying of the injection vial may not be achievable in a straightforward manner. When using such vial adapters, a residual amount of the medicament may always remain inside the cavity or interior of the injection vial.

In situations or with examples wherein the liquid medicament is comparatively expensive or when the total volume of the injection vial is quite limited such leftovers inside the injection vial may be no longer acceptable and should be avoided.

With some vial adapters there is provided a mechanical connector in fluid communication with the spike by way of which a fluid transfer device, such as a syringe may be fluidically connected to the spike. Such mechanical connectors may comprise a standardized mechanical connector, such as a Luer-type connector. Some injection vials are sealed under vacuum and may comprise a negative pressure inside. Here and for withdrawing a medicament located inside the vial it may be necessary to vent the vial before connecting the fluid transfer device to the mechanical connector.

It is therefore desirable to provide an improved vial adapter that enables or provides a complete or nearly complete emptying of an injection vial, such that a residual amount of medicament left in the injection vial can be minimized or can be even avoided.

It is a further aim to provide improvements for vial adapters by way of which the vial connected to the vial adapter will be vented before a fluid transfer device is fluidically connected or connectable to the spike.

SUMMARY

The above-mentioned disadvantages and shortcomings are solved by vial adapter, by an injection kit and by a method of withdrawing a liquid medicament in accordance with the features of the independent claims. Various examples and embodiments are subject matter of the dependent claims, respectively.

In one aspect there is provided a vial adapter for connecting to an injection vial. The injection vial comprises a barrel and a barrel head. The barrel head comprises or forms an outlet, through which a liquid medicament located inside a cavity or interior volume of the barrel can be withdrawn from the injection vial. The outlet is sealed by a pierceable stopper and the pierceable stopper comprises an inside surface, e.g., facing towards the cavity of the injection vial.

The vial adapter, which is configured for connecting to the injection vial, comprises an adapter body and a movable part. The adapter body comprises a top wall and a sidewall. The sidewall projects from the top wall, e.g., from an outer circumference or outer edge of the top wall in a longitudinal direction. The sidewall of the adapter body projects or protrudes from the top wall in the longitudinal direction to form a receptacle, e.g., a cup-shaped receptacle with an inside surface or distal side of the top wall. The cup-shaped receptacle is configured to receive at least a portion of the barrel head. The receptacle may be configured to engage, e.g., to mechanically engage or to mechanically fasten to the barrel head of the injection vial.

The vial adapter further comprises a movable part. The movable part comprises a base part and a spike, which is fixed to the base part. The spike extends through the top wall and/or through the base part, e.g., along the longitudinal direction. The spike may comprise an elongated fluid channel. The elongated fluid channel may comprise a proximal channel section merging into a mechanical connector of the vial adapter and may further comprise a distal channel section.

The movable part may be movable relative to the adapter body in a longitudinal direction. The spike may comprise a tipped distal end to penetrate the pierceable stopper.

The spike is fixed to the movable part. It may be fixed to the base part. This way and by moving one of the movable part and its base part the spike is movable and/is moved relative to the adapter body.

The vial adapter further comprises an actuating member, which is actuatable by a user. The actuating member is mechanically coupled to the movable part, e.g., to the base part, by a mechanical coupling. The actuating member is movable relative to the adapter body from a start position to an end position along a first direction to induce a distally directed displacement of the movable part relative to the adapter body. The mechanical coupling between the actuating member and the movable part is such, that the actuating member is configured and operable to transfer a distally directed displacement onto the movable part, which due to the displacement or movement of the actuating member from the start position towards and into the end position transfers into a distally directed displacement of the movable part relative to the adapter body.

In this way it can be provided, that the spike, and in particular at least the distal end of the spike, penetrates the pierceable stopper of the injection vial when the adapter body is duly attached to the barrel head of the barrel of the injection vial.

The mechanical coupling between the movable part and the actuating member is releasable when the actuating member is in the end position. The mechanical coupling may be releasable by moving the actuating member into the end position or when reaching the end position. By releasing the mechanical coupling between the movable part and the actuating member it can be provided that the movable part is free to move relative to the actuating member and/or relative to the base part of the vial adapter.

A mechanical a decoupling or mechanical disengagement between the movable part and the actuating member may allow and/or support a movement of the movable part in a proximal direction relative to the adapter body. Hence, by releasing or abrogating the mechanical coupling between the movable part and the actuating member the actuating member may be moved in proximal longitudinal direction to provide a well-defined alignment between the spike and the inside surface of the pierceable stopper.

A proper alignment of the spike relative to the inside surface of the pierceable stopper allows and provides a complete or restless emptying of the injection vial when a fluid transfer device, such as a syringe, is attached to and/or fluidically connected to the spike for withdrawing a liquid content of the injection vial.

According to a further example the movable part may be movable relative to the adapter body and/or relative to the actuating member from an undeployed position towards and into a deployed position. In the undeployed position, a connection of a fluid transfer device to the spike may be effectively prevented. Here, and when in the undeployed position the mechanical connector, which may be in fluid communication with the spike and which may be intended or configured for fluidically coupling of fluidically connecting to the fluid transfer device may be concealed or covered by at least one of the adapter body and the actuation member.

For duly connecting a fluid transfer device to a mechanical connector of the vial adapter, e.g., to a mechanical connector in fluid communication with the spike of the vial adapter, it may be required to move the movable part into the deployed position, in which the mechanical connector of the vial adapter is accessible for the fluid transfer device. It may be provided that the fluid transfer device, e.g., intended for withdrawing a liquid substance from the cavity of the injection vial, can be only and exclusively fluidically coupled or fluidically connected to the spike when the movable part is in the deployed position.

According to some examples it may be provided that the mechanical coupling between the movable part and the actuating member keeps the movable part in the undeployed position. A movement or displacement of the movable part from the undeployed position into the deployed position may require a release of the mechanical coupling between the movable part and the actuating member. In this way, a premature fluid transferring connection between the spike and a fluid transfer device, while the movable part is in the undeployed position, can be prevented.

Moreover, since the mechanical coupling between the movable part and the actuating member may be only releasable or decoupleable when the actuating member is in the end position, a transfer of the actuating member from the undeployed position into the deployed position may be only possible after the actuating member has reached the end position.

A displacement of the actuating member from the start position to the end position further implies or induces a well-defined distally directed displacement of the movable part relative to the adapter body. When the vial adapter is duly attached to the injection vial before the actuating member is actuated by a user and before the actuating member is moved from the start position to and into the end position it can be provided that the spike of the movable part completely penetrates the pierceable stopper of the injection vial when the actuating member has reached the end position.

In this configuration it can be thus ensured, that the injection vial is vented because the spike, comprising a channel aperture merging into a fluid channel to fluidically connect to the fluid transfer device, has completely penetrated the pierceable stopper and is located inside the cavity of the injection vial. In this way and before a release of the mechanical connection between the movable part and the actuating member, there may be provided a venting of the injection vial. It may be only then that the mechanical coupling between the movable part and the actuating member is released by way of which the movable part may be free to move from the undeployed position towards and into the deployed position, in which a fluid transferring connection between the external fluid transfer device and the spike of the vial adapter can be established.

Insofar, the user actuatable actuating member and its releasable mechanical coupling to the movable part provides a two-fold function. By way of the actuating member and by moving the actuating member from the start position to the end position the movable part can be brought into a distal end position, in which a channel aperture of the spike has properly penetrated the pierceable stopper of the injection vial. Thereafter, and upon release of the mechanical coupling between the movable part and the actuating member, the actuating member may be free to move relative to the adapter body and/or relative to the actuating member to reach the undeployed position, in which the movable part and hence the fluid guiding structure of the spike can be duly connected to a fluid transfer device.

Moreover, the longitudinal movability of the movable part and hence of the spike, relative to the adapter body provides and enables a precise and intended alignment between a channel aperture of a fluid channel extending through the spike and the inside surface of the pierceable stopper. In this way and when inverting the orientation of the vial adapter, attached to the injection vial into an upside-down configuration, there can be provided a rather easy and straightforward restless or complete withdrawal of a liquid content provided inside the injection vial.

According to a further example the actuating member is movable relative to the adapter body along a second direction to release the mechanical coupling between the movable part and the actuating member. Here, it may be required that the user induces a movement of the actuating member along a first direction to displace the actuating member from the start position to the end position. When and after having reached the end position the actuating member may be movable relative to the adapter body along the second direction. When moving the actuating member along the second direction the mechanical coupling between the movable part and the actuating member may be released and/or abrogated.

It may be provided that the actuating member is only movable along the first direction when and as long as being located between the start position and the end position. It may be provided that the actuating member is only and exclusively movable relative to the adapter body along the second direction when located in the end position and/or after having reached the end position.

Accordingly, a movement of the actuating member along the second direction, which may lead to a release of the mechanical coupling between the movable part and the actuating member, may be blocked as long as the actuating member is located between the start position and the end position. In this way a premature decoupling or release of the mechanical coupling between the movable part and the actuating member can be effectively prevented.

For disconnecting of the coupling between the movable part and the actuating member it is required to move the actuating member from the start position towards and into the end position. Due to the mechanical coupling between the movable part and the actuating member the respective displacement or movement of the actuating member relative to the adapter body along the first direction may accordingly induce a respective distally directed displacement of the movable part relative to the adapter body, by way of which it may be provided that the spike has properly penetrated the pierceable stopper of the injection vial.

According to a further example the mechanical coupling between the movable part and the actuating member is and remains intact as long as the movable part is located offset from the end position. In this way it can be provided that a release of the mechanical coupling is only and exclusively possible when the actuating member has reached the end position.

According to some examples the first direction may be a longitudinal direction. The first direction, along which the actuating member is movable from the start position to the end position may extend parallel to and/or along the longitudinal distal direction. Here, the actuating member may be longitudinally and/or slidably displaceable relative to the adapter body. It may be in sliding engagement with the adapter body for moving the actuating member from the start position towards and into the end position.

The second direction may extend perpendicular to the first direction. It may extend under a predefined angle relative to the first direction. In some examples the second direction may extend laterally or radially with regard to a cylindrical shape of the sidewall of the receptacle of the adapter body. Here, the sidewall of the adapter body confining the receptacle of the adapter body in a circumferential direction may be of a somewhat cylindrical shape.

The second direction, along which the actuating member may be movable may extend along a circumference of the sidewall and/or or along a circumference of a cylindrical reference or coordinate system as defined by the sidewall of the adapter body or as defined by a cylindrically shaped barrel of the injection vial when duly attached to the vial adapter.

According to a further example the vial adapter comprises a biasing element, which is operably engaged with the adapter body and with the movable part. The biasing element is configured to apply a biasing force between the adapter body and the movable part, which biasing force is effective to displace the movable part from the undeployed position towards and into the deployed position. In this way, and by releasing the mechanical coupling between the movable part and the actuating member, the movable part may be immediately moved or pushed from the undeployed position towards and into the deployed position under the effect of the biasing element.

In the undeployed position the biasing element may store mechanical energy, which is sufficient to move the movable part relative to the adapter body and/or relative to the actuating member as soon the mechanical coupling between the movable part and the actuating member has been released. In this way, the biasing element may release mechanical energy onto the movable part and may provide an automatic deployment of the vial adapter and hence a rather automated movement or displacement of the movable part from the undeployed position to and into the deployed position.

When in the deployed position the mechanical connector of the movable part can be duly connected with a fluid transfer device in a fluid communicating way or fluid transferring manner.

According to a further example the movable part is movable under the action of the biasing element only when the mechanical coupling between the movable part and the actuating member is released. In some examples the biasing member may be configured to urge the movable part in a longitudinal proximal direction relative to the adapter body. The movable part may be longitudinally guided by the adapter body and may be in a longitudinal sliding engagement with the adapter body. In this way and upon release of the mechanical coupling between the movable part and the actuating member the movable part is free to become displaced or pushed in the proximal direction under the effect of the relaxing biasing element.

According to some examples the biasing element may be configured to move the movable part in a proximal direction relative to the adapter body. Moreover and since actuation of the actuating member, hence a movement of the actuating member from the start position to the end position induces a distally directed displacement of the movable part, the displacement of the actuating member along the first direction may be operable to bias the biasing element and hence to store mechanical energy in the biasing element, which upon release of the mechanical coupling between the movable part and the actuating member is released and is hence operable to displace or to move the movable part from the undeployed position into the deployed position, e.g., in a longitudinal proximal direction. Accordingly, the user inducible movement of the actuating member from the start position to the end position may act against a force effect and hence against the biasing force emanating from the biasing element.

Moreover, and due to the mechanical coupling between the movable part and the actuating member the actuating member may be kept or held in the start position by the biasing element.

In this way, an inadvertent or occasional displacement or movement of the actuating member from the start position to the end position can be effectively prevented. A user may have to apply a respective force effect above a force threshold or biasing force of the biasing element in order to move the actuating member from the start position towards and into the end position.

According to a further example it may be provided that the actuating member is fixable relative to the adapter body with regard to the first direction when or after being moved along the second direction. In this way it can be effectively prevented that the actuating member is moved in a direction opposite the first direction after the mechanical coupling between the movable part and the actuating member has been released or abrogated. Here, it can be provided that the movable part is movable relative to both, the actuating member and the adapter body upon release of the mechanical coupling between the movable part and the actuating member.

Accordingly, and by moving the actuating member along the second direction the actuating member can be locked or immobilized relative to the adapter body with regard to the first direction while releasing the mechanical coupling with the movable part.

In this way and after moving the movable part into the deployed position, the actuating member cannot be returned from the end position back to the start position.

According to a further example the spike comprises an elongated fluid channel, a tipped distal end to penetrate the pierceable stopper and a channel aperture in fluid communication with the fluid channel.

The channel aperture may be located at or near the tipped distal end of the spike. The channel aperture is located inside the receptacle of the adapter body and may be located proximally offset from the tipped distal end of the cannula. The channel aperture may be in permanent flow communication with the distal channel section of the spike or cannula.

The elongated fluid channel may comprise a distal channel section, which is provided with the channel aperture. Hence, the channel aperture may provide a fluid communication between an exterior around the tipped end and the distal channel section.

The channel aperture is in permanent fluid connection with the elongated fluid channel extending into or through the tipped cannula. The channel aperture may comprise or constitute a distal end of the elongated fluid channel.

Since the channel aperture is located proximally offset from the tipped distal end it can be provided that the channel aperture gets in flow communication or fluid communication with an interior of the injection vial only after the tipped distal end of the tipped cannula has penetrated the pierceable stopper to a sufficient degree, e.g., completely.

With the channel aperture located proximally offset from the tipped distal end of the tipped cannula it can be provided that the channel aperture, through which the elongated fluid channel may exclusively get in flow of fluid communication with the interior of the barrel of the injection vial, is located fairly close to the inside surface of the pierceable stopper when the vial adapter and/or the movable part thereof has or have reached a final assembly configuration.

According to a further example the spike may comprise a tipped cannula which is made of a metallic material. The tipped cannula may be a single pieced cannula. It may be unitarily shaped and may consist of only one piece.

A metallic tipped cannula or a tipped cannula made of a metallic material is rather robust and may provide a reliable, long-lasting and durable use. It may provide a rather straightforward and easy penetration of the pierceable stopper, which may be made of an elastomeric material, such as natural or synthetic rubber. Moreover, a tipped cannula made of a metallic material may provide a proper penetration or cutting through the material of the pierceable stopper, such that the material of the pierceable stopper does not enter, clog or otherwise block a lumen of the fluid channel of the tipped cannula.

According to a further example the tipped cannula is made of stainless steel. Stainless steel may provide a stable, and non-wearing tipped cannula.

According to a further example the adapter body and/or the base part of the vial adapter may comprise a plastic material or may be made of a plastic material. The adapter body may be a single pieced plastic material. Also, the base part of the movable part may comprise a single or unitarily formed plastic body.

The adapter body and/or the base part may comprise an injection molded plastic body, which can be manufactured and assembled in a mass manufacturing process rather cost-efficiently.

According to a further example the base part comprises a molded body and the tipped cannula is insert molded in the molded body. With further examples the molded body may comprise an injection molded body. The molded body may comprise a one-component or two-component injection molded plastic body, with an insert molded tipped cannula.

Here, the tipped cannula may be made of a material that distinguishes from the material of the molded body. In some examples the insert molded tipped cannula comprises a metallic material, such as stainless steel.

According to a further example the movable part is adjustably movable relative to the adapter body along the longitudinal direction to align the channel aperture with the inside surface of the pierceable stopper.

According to a further example the movable part is adjustably movable relative to the adapter body along the longitudinal direction in order to align the channel aperture with the inside surface of the pierceable stopper of the injection vial.

The fluid channel may further comprise a proximal channel section merging into a mechanical connector of the vial adapter. The mechanical connector may provide a mechanical connection to an external fluid transfer device, such as an injection device, e.g., implemented as a syringe. By way of a fluid transfer device a fluid can be urged either from the fluid transfer device into the proximal channel section and/or a fluid originally located inside the interior of the barrel can be withdrawn through the channel aperture into the fluid channel and further into the fluid transfer device.

In use, the mechanical connector may be in fluid communication with the proximal channel section of the elongated fluid channel so as to provide a fluid transfer from the channel aperture of the elongated fluid channel through the fluid channel towards and into the proximal channel section. Depending on the type of fluid transfer device the mechanical connector may be also used to provide a fluid transfer from the fluid transfer device into the proximal channel section towards the distal channel section and through the channel aperture into the interior of the injection vial.

Since the movable part is longitudinally movable relative to the adapter body there can be provided an adjustable longitudinal position of the channel aperture inside the injection vial when the elongated fluid channel has penetrated the pierceable stopper of the injection vial and when the adapter body is engaged with the barrel head or when the adapter body is fastened to the barrel of the injection vial.

By adjustably moving the movable part of the vial adapter relative to the adapter body there can be provided a longitudinal alignment of the channel aperture of the fluid channel with the inside surface of the pierceable stopper. In other words, a penetration depth of the fluid channel extending through the top wall of the adapter body and extending through the pierceable stopper of the vial can be adjusted such that a longitudinal distance between the channel aperture and the inside surface of the pierceable stopper is minimized.

In some examples a longitudinal distance between the channel aperture of the fluid channel of the movable part and the inside surface of the pierceable stopper of the injection vial can be minimized to zero. Hence, the channel aperture of the fluid channel may be flush, e.g., in a transverse direction, with the inside surface of the pierceable stopper.

In further examples the channel aperture may even longitudinally overlap with the inside surface of the pierceable stopper. In this way, it can be even guaranteed, that the channel aperture, through which the liquid medicament can be withdrawn from the cavity of the injection vial, is at a lower most longitudinal position when the injection vial with the vial adapter attached thereto is in an inverted configuration, i.e. an upside-down configuration, for withdrawing the liquid medicament from the injection vial.

In this way and by aligning the channel aperture of the fluid channel of the movable part of the vial adapter to the inside surface of the pierceable stopper the entirety of the medicament can be rather easily withdrawn into the channel aperture and through the fluid channel towards the mechanical connector of the movable part and further into an injection device or other external device configured for receiving the liquid medicament or liquid substance originally contained inside the injection vial.

In some examples the movable part is longitudinally movable relative to the adapter body within a limited longitudinal extent, which is large enough to compensate for eventual manufacturing and assembly tolerances of the barrel, the vial adapter and the mutual assembly of the vial adapter and the barrel of the injection vial.

In some examples the maximum longitudinal displacement between the movable part and the adapter body is less than 1 cm, less than 8 mm or less than 5 mm.

Moreover, the adapter body and the movable part may be non-detachably connected. The movable part may be movable in a longitudinal direction relative to the adapter body within a limited range, wherein the limited range is governed or determined by manufacturing tolerances and/or assembly tolerances of at least one of the vial adapter, the injection vial and the pierceable stopper.

In further examples the movable part is not only adjustably movable relative to the adapter body along the longitudinal direction. It may be variably movable and variably fixable relative to the adapter body.

In some examples the movable part may be continuously movable relative to the adapter body along the longitudinal direction. The movable part may be fixable relative to the adapter body in any longitudinal position relative to the movable part.

In this way, the channel aperture of the elongated fluid channel of the movable part may not only temporarily align or overlap with the inside surface of the pierceable stopper but may also be fixed relative to the adapter body and hence to the pierceable stopper in any of the adjustable longitudinal positions relative to the movable part and/or relative to the pierceable stopper. In this way, the channel aperture of the fluid channel can be fixed relative to the pierceable stopper and/or relative to the adapter body such that the aligned position or arrangement of the channel aperture at or with the inside surface of the pierceable stopper can be maintained during the process of withdrawal of the liquid content from the injection vial.

In this way, the vial adapter can be configured to compensate for eventual manufacturing tolerances and/or assembly tolerances of at least one of the injection vial, the barrel, the barrel head, the dimensions or position of the pierceable stopper and manufacturing or assembly tolerances of the vial adapter itself.

According to a further example the spike comprises an elongated channel sidewall and a channel projection. The elongated channel sidewall confines the fluid channel. The channel projection protrudes laterally or radially outwardly from the elongated channel sidewall and comprises a proximally facing abutment face to abut longitudinally with the inside surface of the pierceable stopper. Here, the channel projection may provide a well-defined longitudinal abutment with the inside surface of the pierceable stopper after having penetrated the pierceable stopper in a distal direction.

The channel projection with its proximally facing abutment face serves to prevent an uncontrolled movement or disengagement of the fluid channel relative to the piercable stopper in a proximal direction. It provides a well-defined longitudinal abutment of the channel aperture at the inside surface of the pierceable stopper and hence provides a rather precise alignment of the channel aperture with the inside surface of the pierceable stopper.

In some examples, the channel projection substantially aligns or coincides with the channel aperture as seen in a longitudinal direction. The channel projection may adjoin the channel aperture or it may be provided at an opposite side of the channel sidewall compared to the channel aperture. By way of the channel projection an uncontrolled movement of the fluid channel through the pierceable stopper in a proximal direction can be effectively prevented. Rather, and by way of the channel projection there can be provided a well-defined longitudinal position of the fluid channel relative to the pierceable stopper such that the channel aperture aligns with the inside surface of the pierceable stopper, which alignment enables a complete or nearly complete withdrawal of the liquid contained of the injection vial.

In some examples and when the movable part is displaceable in a distal direction relative to the adapter body against the action of the biasing element, after penetration of the pierceable stopper and after a release of the movable part the biasing element may provide or induce a proximally directed displacement of the movable part relative to the adapter body until the channel projection engages or abuts with the inside surface of the pierceable stopper. Here, the proximally facing abutment face of the channel projection may define an end position or alignment position, which is automatically reached by the movable part under the effect of the relaxing biasing element. When reaching the end position or alignment position the channel aperture is flush with or is aligned with the inside surface of the pierceable stopper.

In order to provide a precise alignment of the channel aperture with the inside surface of the pierceable stopper it may be intended to move the movable part in a proximal direction relative to the adapter body after fastening or engaging the adapter body with the barrel head until the channel projection abuts or engages with the inside surface of the pierceable stopper.

According to a further example the channel projection is longitudinally aligned with the channel aperture. Hence, the longitudinal position of the channel projection may overlap or may substantially coincide with a longitudinal position of the channel aperture. In this way, it can be provided that the channel aperture, which is in fluid communication with the elongated fluid channel of the movable part, is longitudinally aligned with the inside surface of the pierceable stopper.

In an upside-down configuration, wherein the barrel head and hence the pierceable stopper is located at a lower most portion of the injection vial it can be provided that the entire liquid content or liquid substance inside the injection vial can be withdrawn through the channel aperture and through the elongated fluid channel towards the mechanical connector of the vial adapter and hence to an injection device or other kind of a medicament container connectable to the mechanical connector.

According to a further example the movable part comprises a mechanical connector to fluidically connect with a fluid transfer device. The fluid channel of the spike merges into the mechanical connector. The mechanical connector may comprise a receptacle to engage or to connect, e.g., to fluidically connect with the fluid transfer device. A proximal end of the fluid channel may merge into this receptacle and hence into the mechanical connector. In this way and when the fluid transfer device, e.g., implemented as a syringe, is duly connected to the mechanical connector, the fluid transfer device may be fluidically connected to the fluid channel and hence to the interior or lumen of the spike.

The mechanical connector may be provided at a proximal end of the movable part. The mechanical connector may be hence located at a longitudinal side or longitudinal end that is opposite to the free end of the spike. The mechanical connector may be implemented as a standardized mechanical and fluid transferring connector, such as a Luer-type connector. In this way, a complementary or correspondingly shaped fluid transfer device can be easily attached and fluidically connected to the mechanical connector and hence to the movable part as well as to the fluid channel extending into the spike and hence extending into the cavity of the barrel of the injection vial when the vial adapter is duly attached to the injection vial and when the spike has pierced the pierceable stopper.

According to a further example the mechanical connector protrudes from a proximal end of at least one of the adapter body and the actuating member when the movable part is in the deployed position. In this way and when in the deployed position by protruding from the proximal end of at least one of the adapter body and the actuating member the mechanical connector is easily accessible for connecting to the fluid transfer device.

In some examples the mechanical connector may protrude from both proximal ends, namely from the proximal end of the adapter body and from the proximal end of the actuating member when the movable part of the vial adapter is in the deployed position. The deployed position of the movable part may be a proximal end position of the movable part relative to the adapter body.

According to another example the mechanical connector is concealed by at least one of the adapter body and the actuating member when the movable part is in the undeployed position. In this way and when concealed the mechanical connector may be inaccessible for connecting with a complementary shaped counter connector of a fluid transfer device. Here, and as long as the movable part is in the undeployed position or has not yet reached the deployed position a mechanical connection or fluid transferring connection to the mechanical connector may be effectively prevented.

For connecting a fluid transfer device, such as a withdrawing syringe to the vial adapter, it may be required to displace the movable part from the undeployed position into the deployed position. This movement may be accompanied, triggered or even controlled or induced by the biasing element. This movement into the undeployed position may further require a release of the mechanical coupling between the movable part and the actuating member. Such a decoupling may be only possible after the actuating member has been moved or displaced from the start position to the end position.

Such a user-inducible movement may be accompanied by a distally directed displacement of the movable part relative to the adapter body, thereby ensuring that the spike has penetrated the pierceable stopper to a sufficient degree, such that the channel aperture of the fluid channel of the spike is in fluid communication with the cavity of the barrel of the injection vial.

According to a further example the adapter body comprises a longitudinally extending guiding structure along which the movable part is movably guided in a longitudinal direction. By way of the guiding structure the movable part can be guided in the longitudinal direction relative to the adapter body. Providing a guiding structure may provide a rather stable and tilt free longitudinal displacement of the movable part relative to the adapter body.

According to a further example the base part of the movable part is in longitudinal sliding engagement with the guiding structure of the adapter body. By way of a sliding engagement there can be likewise provided a variable and longitudinally adjustable variable position of the movable part relative to the adapter body.

A sliding engagement may likewise provide a user-adjustable or user-controllable longitudinal position adjustment for the movable part relative to the adapter body and/or relative to the pierceable stopper, e.g., in order to obtain a desirable alignment of the channel aperture of the fluid channel of the movable part and the inside surface of the pierceable stopper of the injection vial.

A sliding engagement between the guiding structure and the movable part may be rather easily controllable. Moreover, a sliding engagement may provide a rather intuitive handling for varying the longitudinal position of the channel aperture of the fluid channel of the movable part relative to the adapter body and/or relative to the pierceable stopper of the injection vial.

In a further example the guiding structure comprises a bottom facing in a longitudinal proximal direction. The movable part, e.g., the base part of the movable part, comprises an abutment face facing in a longitudinal distal direction. The bottom may be at least in sections complementary shaped to the abutment face of the movable part; and vice versa. In this way, the bottom may provide a stop face configured or operable to delimit a distally directed displacement or movement of the movable part relative to the adapter body.

In a further example the guiding structure comprises a guiding receptacle in which the movable part is movably guided in a longitudinal direction. The guiding receptacle may circumferentially enclose at least a portion of the movable part. This may provide an improved guiding functionality.

Moreover, by way of a guiding receptacle, the outer dimensions of the movable part can be minimized so as to fit into the interior of the guiding receptacle. The guiding receptacle and hence the guiding structure of the adapter body allows for a rather conventional design of the receptacle of the adapter body, such that a fastening to the injection vial can be provided in a rather conventional and well-established manner. At the same time a guiding receptacle provides a rather efficient and straightforward longitudinal guiding for the movable part relative to the adapter body.

According to a further example the guiding receptacle of the adapter body comprises a receptacle sidewall. The base part of the movable part comprises a base part sidewall with an outside surface, which is at least in sections complementary shaped to the receptacle sidewall. The receptacle sidewall comprises an inside facing surface that is complementary shaped to the outside surface of the base part sidewall. In this way, there can be provided a rather well-defined, stable and easily controllable longitudinal sliding displacement of the movable part relative to the adapter body. The receptacle sidewall of the guiding receptacle and hence of the adapter body may provide a rather tilt free and hence a rather precise longitudinal displacement of the movable part relative to the adapter body.

In further examples the guiding receptacle of the adapter body can be delimited by the bottom in a distal direction. Hence, the receptacle sidewall and of the guiding receptacle may be confined in the distal direction by the bottom of the guiding structure.

According to a further example the movable part comprises the abutment face facing in a longitudinal distal direction. The abutment face of the movable part may be opposite the bottom of the guiding structure or guiding receptacle.

According to a further example the abutment face of the movable part is configured to longitudinally abut with the bottom of the guiding receptacle. In this way, the distally directed longitudinal displacement of the movable part relative to the adapter body can be delimited by a longitudinal engagement or abutment of the bottom of the guiding receptacle with the abutment face or bottom face of the movable part.

According to a further example the guiding structure comprises a recess, e.g., a through recess. The movable part comprises a projection extending laterally or radially into or through the recess. The recess may be provided in the receptacle sidewall. It may comprise a longitudinal extent that defines a maximum longitudinal displacement of the movable part relative to the adapter body. Hence, the projection of the movable part may be guided in and/or along the recess of the guiding structure.

In a further example the movable part may be provided with a recess and the guiding structure may be provided with a projection being longitudinally guided in the recess.

Accordingly, the mutual engagement between the projection of the movable part and the recess of the body structure may provide a well-defined non-rotative and longitudinal guiding of the movable part with respect to the guiding structure and hence with respect to the adapter body.

Accordingly, and with further examples the recess or through recess may be delimited in a distal direction by a distal stop face and may be further delimited in a proximal direction by a proximal stop face. The proximal stop face faces distally and the distally located stop face faces proximally.

Accordingly, the projection, e.g., of the movable part, which extends radially into or through the recess may longitudinally abut with one of the distal or proximal stop faces as defined by the recess when the lateral projection is urged in a longitudinal distal or longitudinal proximal direction by a user or by a biasing element. In this way there can be provided a limited longitudinal displacement of the movable part relative to the adapter body, which is large enough to compensate manufacturing tolerances as well as assembly tolerances of the injection vial and the vial adapter.

In examples wherein the movable part is in longitudinal sliding engagement with the guiding receptacle the movable part may comprise a gliding surface, e.g., on its base part's sidewall and the guiding receptacle may comprise an inside facing complementary shaped gliding or sliding surface in order to provide a smooth longitudinal gliding or sliding of the movable part relative to the adapter body. Here, the base part of the movable part may longitudinally slide or glide relative to the receptacle sidewall of the guiding receptacle of the adapter body.

In a further example the recess of the guiding structure and/or of the receptacle sidewall of the adapter body comprises a distally facing stop face. The recess may be further delimited in a proximal direction by the distally facing stop face. The distally facing stop face is configured to longitudinally abut with the projection, e.g., with a proximally facing stop face of the projection.

Likewise, the recess may also comprise a proximally facing stop face. It may be delimited by the proximally facing stop face. The proximally facing stop face is configured to longitudinally abut with the projection and specifically, with a distally facing and complementary shaped stop face of the projection. In this way, the longitudinal displacement of the movable part relative to the adapter body can be precisely delimited by the longitudinal extent of the recess located on an inside of the receptacle sidewall and/or extending through the receptacle sidewall.

According to some examples the movable part, in particular the base part of the movable part, comprises a cylindrical shape. It may comprise a cylindrically shaped body with a cylindrically shaped outside surface. The outside surface may be implemented as a gliding surface configured to glide and/or to slide in a longitudinal direction along an inside surface of the receptacle sidewall of the guiding receptacle. Accordingly, the receptacle sidewall may be also of cylindrical shape. It may comprise an inside gliding surface that is in gliding engagement with the outside surface of the movable part or base part.

By way of the projection extending laterally, e.g., radially into or through the recess of the receptacle sidewall the movable part may be rotationally fixed to the guiding structure and hence to the guiding receptacle with regard to the longitudinal axis as an axis of rotation. In this way, it can be effectively prevented that the base part rotates with respect to the longitudinal axis relative to the adapter body.

According to some examples the actuating member comprises an actuating sleeve. The actuating sleeve may be of cylindrical shape. The actuating member may be also in sliding or gliding engagement with the receptacle sidewall. In some examples the movable part may be in sliding engagement with an inside surface of the receptacle sidewall. The actuating member may be in a sliding or gliding engagement with an outside surface of the receptacle sidewall. Hence, the actuating member, e.g., implemented as an actuating sleeve, may comprise an inside surface that is in sliding or gliding engagement with the outside surface of the receptacle sidewall.

The mechanical coupling between the actuating member and the movable part may extend through the guiding structure and hence through the receptacle sidewall. In this way, the movable part, which is accessible from outside the guiding receptacle, is mechanically engaged via the mechanical coupling with the movable part, which is located inside the guiding receptacle. In this way, the movable part, which due to its arrangement inside the guiding receptacle is generally inaccessible from outside the guiding receptacle, can be indirectly moved via the actuating member and the mechanical coupling.

According to some examples the guiding receptacle and the receptacle sidewall thereof may provide a twofold guiding functionality. The receptacle sidewall may provide a longitudinal sliding or gliding of the movable part located inside the guiding receptacle. The receptacle sidewall may further provide a longitudinal sliding or gliding of the actuating member, which is located outside the receptacle outside wall.

According to a further example the guiding structure comprises a guiding slot extending laterally or radially through the receptacle sidewall of the guiding receptacle. In this way, there can be provided a mechanical link between the movable part and the actuating member that may form or constitute the mechanical coupling.

According to a further example the guiding slot comprises a first slot section and a second slot section merging into the first slot section. The first slot section may extend parallel to the first direction. Accordingly, the first slot section and a longitudinal extent thereof may define the first direction along which the actuating member is movable from the start position to the end position.

In some examples the first slot section extends in a longitudinal direction. In this way, the first direction is oriented along the longitudinal direction. The movement of the actuating member from the start position to the end position may be hence a longitudinal sliding movement of the actuating member relative to the body. In some examples, the movement from the start position to the end position is a longitudinal distally directed displacement or movement of the actuating member relative to the adapter body.

According to some examples the second slot section merges with a longitudinal end of the first slot section. Vice versa, a longitudinal end of the second slot section merges with a longitudinal end of the first slot section. The guiding slot may be of L-shaped structure.

According to some examples the first slot section comprises an elongation that exceeds the elongation of the second slot section.

According to a further example the second slot section extends in a circumferential direction with regard to the cylindrical shape of the guiding structure and/or of the receptacle sidewall of the guiding receptacle. In this way, the movement of the actuating member along the guiding slot may include a first movement along the first slot section by way of which the actuating member is moved from the start position to the end position. When reaching the longitudinal end of the first slot section the actuating member may be located in the end position. It may be then that the actuating member is movable along the second direction by way of which the actuating member is moved along the second slot section.

According to some examples, the first movement of the actuating member along the first slot section may be a longitudinal distally directed sliding movement relative to the adapter body. A second movement of the actuating member along the second direction may be a rotative or rotational movement relative to the adapter body along the circumference of the cylindrically shaped guiding structure or guiding receptacle.

According to a further example the actuating member is mechanically coupled to the movable part via a sliding block extending through the guiding slot. The sliding block may be permanently fixed to the actuating member. It may protrude radially inside from inside surface of the actuating sleeve of the actuating member. It may be hence in permanent engagement with the guiding slot. In this way the actuating member is limited to a movement along the guiding slot. It may be moved from the start position to the end position along the first slot section and it may be moved in the second direction defined by the elongation of the second slot section in order to disengage the mechanical coupling between the movable part and the actuating member.

According to a further example the movable part comprises a release track with a first track section and a second track section, in which the sliding block fixed to the actuating member is guided.

According to some examples the movable part is rotationally fixed to the adapter body. It may be rotationally fixed to the adapter body via the projection extending laterally or radially into or through the recess of the guiding structure and hence into or through the recess as provided in the receptacle sidewall of the guiding receptacle. The release track may be provided as a groove in the outside surface of the base part of the movable part. The release track may be initially engaged with the sliding block. By way of the sliding block extending radially inwardly from the actuating member through the guiding slot and into the release track there can be provided the releasable mechanical coupling between the movable part and the actuating member, which mechanical coupling extends through the guiding structure and hence through the guiding receptacle as well as through the receptacle sidewall of the adapter body.

The release track may be open ended. By way of moving the actuating member along the second direction the sliding block may slide along the release track towards the open end of the release track, through which the sliding block may escape from the release track. The movable part may be fixed to the adapter body with respect to a movement along the second direction. In this way and as soon as the actuating member is moved along the second direction the sliding block is subject to a movement relative to the release track along the second direction until the sliding block reaches the open end at which the sliding block may escape the release track, thereby releasing the mechanical coupling between the movable part and the actuating member.

According to a further example the second track section of the release track comprises an opening at an end section facing away the first track section. The mechanical coupling between the movable part and the actuating member is releasable by moving the sliding block fixed to the actuating member along the first track section into the second track section, from which the sliding block is allowed to escape from the release track.

The second track section may be open ended in a longitudinal direction. The first track section may extend in a circumferential direction and may comprise a dead end section at an end located opposite the second track section, in which the sliding block may be initially located. In this way, there can be transferred a longitudinal force effect between the actuating member and the movable part as long as the sliding block is located in the first track section, and close to the dead end of the first track section.

A movement of the actuating member and hence of the sliding block along the first track section into the open ended second track section allows the sliding block to escape in a longitudinal direction from the release track.

According to a further example the release track may be located at a longitudinal end section of the outside surface of outside facing sidewall of the movable part or base part. In this way, the second track section may be open ended and may merge into an end face of the base part.

In another aspect the present disclosure also relates to an injection kit for administering a liquid medicament. The injection kit comprises an injection vial. The injection vial comprises a barrel to accommodate a liquid medicament or a liquid substance. The injection vial further comprises a barrel head with an outlet. The outlet is sealed by a pierceable stopper, such as a septum. The pierceable stopper comprises an inside surface delimiting or adjoining the inner cavity of the injection vial that is filled or provided with the liquid substance.

The injection kit further comprises a vial adapter as described above, which is configured for fastening to the barrel head of the injection vial. The vial adapter comprises a movable part with the spike, the movable part is longitudinally movable relative to an adapter body, wherein the adapter body is configured for a direct fastening or direct engagement with the barrel head.

The spike may be fixed to a base part of the movable part and may extend through the top wall of the adapter body in a distal direction into the receptacle as confined by the adapter body. The vial adapter further comprises an actuating member, which is actuatable by a user and which is mechanically coupled to the movable part by a mechanical coupling. The actuating member is movable relative to the adapter body from a start position to an end position along a first direction, e.g., along a first longitudinal direction, to induce a distally directed displacement of the movable part relative to the adapter body.

The mechanical coupling between the movable part and the actuating member is releasable when the actuating member is in the end position. According to some examples, the mechanical coupling between the movable part and the actuating member may automatically release by moving the actuating member in the end position or when the actuating member reaches the end position.

The movable part may be adjustably movable in a longitudinal direction relative to the adapter body to align the channel aperture of the cannula with the inside surface of the pierceable stopper. Then and when reaching a final assembly configuration, the vial adapter with the injection vial may be held or rotated in an upside-down configuration, wherein the pierceable stopper faces downwardly.

Since the channel aperture of the elongated fluid channel of the movable part of the vial adapter is aligned with the inside surface or is flush with the inside surface of the pierceable stopper, the entirety of the liquid substance, e.g., the liquid medicament can be withdrawn from the cavity of the injection vial. The entire content of the injection vial may be thus withdrawn through the fluid channel into a drug delivery device or some other storage device connected to the mechanical connector of the movable part of the vial adapter.

Insofar, and since the injection kit comprises a vial adapter as described above, all features, benefits and effects as described above in connection with the vial adapter equally apply to the injection kit; and vice versa.

According to a further example the injection kit comprises a fluid transfer device, e.g., a syringe or the like injection device, which is configured for fastening to the mechanical connector of the movable part. The fluid transfer device may be configured to withdraw the liquid medicament from an interior of the barrel through the fluid channel of the movable part of the vial adapter. The fluid transfer device may comprise an injection device, which may comprise a syringe. The fluid transfer device may be also operable to introduce a liquid into the interior of the injection barrel. Here, the fluid transfer device may also comprise a syringe configured to expel a liquid substance through the vial adapter into the interior of the injection vial. In some examples the fluid transfer device may comprise a pump device or the like fluid expelling device.

In some examples of the vial adapter the mechanical connector comprises a standardized fluid transferring connector, such as a Luer-type connector. The fluid transfer device or injection device may comprise a complementary shaped standardized counter connector to establish a fluid transferring mutual connection between the fluid transfer device and the mechanical connector of the movable part of the vial adapter. In some examples the mechanical connector of the movable part comprises a conically-shaped receptacle to receive a complementary shaped conically-shaped protrusion of the fluid transfer device; or vice versa. The mechanical connector is in fluid transferring connection with the fluid channel. In some examples the fluid channel may merge in a receptacle of the mechanical connector or, which may be confined by a conically-shaped connector sidewall.

In another aspect the present disclosure also relates to a method of withdrawing a liquid substance, e.g., a liquid medicament, contained in an injection vial. The injection vial comprises a barrel and a barrel head with an outlet, wherein the outlet is sealed by a pierceable stopper and wherein the pierceable stopper comprises an inside surface. The method comprises steps of engaging a vial adapter with the barrel head of the injection vial. The vial adapter comprises an adapter body, a movable part, an actuating member and a mechanical coupling between the movable part and the actuating member. The movable part is provided with a spike configured to penetrate the pierceable stopper of the injection vial.

The spike may be in fluid communication with a mechanical connector as provided at or near an end section of the vial adapter.

The method further comprises the step of penetrating the pierceable stopper in a longitudinal distal direction with the spike. In a subsequent step the method comprises the step of moving the actuating member from a start position to an end position along a first direction thereby inducing a distally directed displacement of the movable part relative to the adapter body. Thereafter the mechanical coupling between the movable part and the actuating member is released.

The release of the mechanical coupling may be obtained by a movement of the actuating member beyond the end position. Here, the actuating member may be moved along a second direction from the end position. In this way, the mechanical coupling between the movable part and the actuating member can be abrogated and/or released.

In some examples the actuating member may be biased by a biasing element by way of which the actuating member can be pushed or urged in a direction opposite the first direction thereby moving or displacing the movable part from an undeployed position towards and into a deployed position, in which the movable part is connectable with a fluid transfer device. As long as the movable part is in an undeployed position a connection with a fluid transfer device may be disabled. In this way and before connecting the fluid transfer device to the vial adapter it will be required that the vial adapter is connected to the injection vial and the actuating member is moved from the start position to the end position thereby inducing a distally directed displacement of the movable part and hence of the spike relative to the pierceable stopper.

The distally directed displacement of the movable part comes along with the predefined movement of the actuating member from the start position to the end position. Only when in the end position the actuating member may be further moved along a second direction to disengage the mechanical coupling between the movable part and the actuating member. It may be then that the movable part is automatically transferred from the undeployed position towards and into the deployed position. A release of the mechanical coupling requires a predefined distally directed displacement of the movable part relative to the adapter body. In this way it can be provided that the spike has duly penetrated the pierceable stopper. In this way and before the movable part reaches the deployed position it can be provided that the cavity of the barrel of the injection vial is vented.

Moreover, by displacement of the movable part from the undeployed position towards and into the deployed position, which may be a proximally directed sliding displacement after penetration of the stopper, it can be further provided that a channel aperture of a fluid channel of the spike is properly aligned with an inside surface of the pierceable stopper of the injection vial. In this way there can be provided a complete and restless emptying or withdrawal of the liquid content from the cavity of the injection vial, when the vial and the vial adapter attached thereto are oriented upside-down.

According to a further example the method of withdrawing the liquid medicament from the injection vial can be conducted and executed with a vial adapter as described above. Insofar, all features, effects and benefits as described above in connection with the vial adapter equally apply to the method of withdrawing a liquid medicament from the injection vial; and the vice versa.

Moreover, by way of the mechanical coupling between the movable part and the actuating member it can be provided that the movable part is secured or locked in the undeployed position, in which the fluid transfer device cannot be attached to the connector of the by the adapter. It may be indispensable to move the actuating member into the end position, in which there will be provided an automated venting of the cavity of the injection vial before the mechanical coupling is released and before the actuating member is free to move into the deployed position, in which establishing of a mechanical connection with the fluid transfer device will be possible.

In a further aspect the present disclosure also relates to a method of administering an injectable medicament, the method comprising the steps of using a vial adapter for connecting to an injection vial, wherein the injection vial comprising a barrel and a barrel head with an outlet, wherein the outlet is sealed by a pierceable stopper and wherein the pierceable stopper comprises an inside surface. The vial adapter comprises an adapter body comprising a top wall and a sidewall, the sidewall projecting from the top wall in a longitudinal direction to form a receptacle with a distal side of the top wall, wherein the receptacle is configured to receive at least a portion of the barrel head.

The vial adapter further comprises a movable part comprising a base part and a spike fixed to the base part. The spike extends through the top wall in a distal direction into the receptacle. The vial adapter further comprises an actuating member, which is actuatable by a user and which is mechanically coupled to the movable part by way of a mechanical coupling. The actuating member is movable relative to the adapter body from a start position to an end position along a first direction to induce a distally directed displacement of the movable part relative to the adapter body.

The mechanical coupling between the movable part and the actuating member is releasable when the actuating member is in the end position. In this way and before releasing the mechanical coupling between the movable part and the actuating member it is indispensable to displace the actuating member into the end position thereby inducing the distally directed displacement of the movable part and hence of the spike. This way, the spike duly penetrates the pierceable stopper and provides a venting of the cavity of the injection vial.

In some examples the method of administering the injectable medicament includes using of a vial adapter and/or of a vial as described above. Insofar, all features, effects and benefits as described above equally apply to the method of administering the injectable medicament.

In a further example the method of administering the injectable medicament comprises the step of connecting the vial adapter to the injection vial.

In another example the method of administering an injectable medicament further comprises the step of moving the actuating member from the start position to the end position thereby inducing the distally directed displacement of the movable part relative to the adapter body. In this way, the cavity of the injection by can be vented.

In a further example, the method of administering the injectable medicament may further comprise to release the mechanical coupling between the movable part and the actuating member when the actuating member is in the end position. By way of a decoupling between the movable part and the actuating member the movable part may be displaceable into a deployed position, in which the movable part and hence the fluid channel of the spike is fluidically connectable to a fluid transfer device.

In the present context the terms proximal and distal are used to distinguish between opposite longitudinal directions with regard to a piercing direction along which the stopper of the injection vial can be or is to be penetrated. Here, the distal direction determines a direction along which the stopper is penetrable from the outside and the proximal direction defines a direction along which the liquid substance can be withdrawn from the cavity of the injection vial.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about-4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des (B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des (B30) human insulin (insulin degludec, Tresiba®); B29-N—(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C (Efpeglenatide), HM-15211, CM-3, GLP-1 Eligen, ORMD-0901, NN-9423, NN-9709, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, ZP-DI-70, TT-401 (Pegapamodtide), BHM-034. MOD-6030, CAM-2036, DA-15864, ARI-2651, ARI-2255, Tirzepatide (LY3298176), Bamadutide (SAR425899), Exenatide-XTEN and Glucagon-Xten.

An example of an oligonucleotide is, for example: mipomersen sodium (Kynamro®), a cholesterol-reducing antisense therapeutic for the treatment of familial hypercholesterolemia or RG012 for the treatment of Alport syndrome.

Examples of DPP4 inhibitors are Linagliptin, Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g., a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, small modular immunopharmaceuticals (SMIP), binding-domain immunoglobulin fusion proteins, camelized antibodies, and immunoglobulin single variable domains. Additional examples of antigen-binding antibody fragments are known in the art.

The term "immunoglobulin single variable domain" (ISV), interchangeably used with "single variable domain", defines immunoglobulin molecules wherein the antigen binding site is present on, and formed by, a single immunoglobulin domain. As such, immunoglobulin single variable domains are capable of specifically binding to an epitope of the antigen without pairing with an additional immunoglobulin variable domain. The binding site of an immunoglobulin single variable domain is formed by a single heavy chain variable domain (VH domain or VHH domain) or a single light chain variable domain (VL domain). Hence, the antigen binding site of an immunoglobulin single variable domain is formed by no more than three CDRs. An immunoglobulin single variable domain (ISV) can be a heavy chain ISV, such as a VH (derived from a conventional four-chain antibody), or VHH (derived from a heavy-chain antibody), including a camelized VH or humanized VHH. For example, the immunoglobulin single variable domain may be a (single) domain antibody, a "dAb" or dAb or a Nanobody® ISV (such as a VHH, including a humanized VHH or camelized VH) or a suitable fragment thereof. [Note: Nanobody® is a registered trademark of Ablynx N.V.]; other single variable domains, or any suitable fragment of any one thereof.

"VHH domains", also known as VHHs, VHH antibody fragments, and VHH antibodies, have originally been described as the antigen binding immunoglobulin variable domain of "heavy chain antibodies" (i.e., of "antibodies devoid of light chains"; Hamers-Casterman et al. 1993 (Nature 363:446-448). The term "VHH domain" has been chosen in order to distinguish these variable domains from the heavy chain variable domains that are present in conventional 4-chain antibodies (which are referred to herein as "VH domains") and from the light chain variable domains that are present in conventional 4-chain antibodies (which are referred to herein as "VL domains"). For a further description of VHH's, reference is made to the review article by Muyldermans 2001 (Reviews in Molecular Biotechnology 74:277-302).

For the term "dAb's" and "domain antibody", reference is for example made to Ward et al. 1989 (Nature 341:544), to Holt et al. 2003 (Trends Biotechnol. 21:484); as well as to WO 2004/058820, WO 2006/030220, WO 2006/003388. It should also be noted that, although less preferred in the context of the present invention because they are not of mammalian origin, single variable domains can be derived from certain species of shark (for example, the so-called "IgNAR domains", see for example WO 2005/18629).

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

In some examples the injection vial is filled or provided with a liquid medicament used in gene therapy for ophthalmic application. Such medicaments may have to be administered in rather small doses, e.g., comprising only a few μl. In addition, such medicaments might be rather costly and should therefore be used entirely.

Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

An example drug delivery device may involve a needle-based injection system as described in Table 1 of section 5.2 of ISO 11608-1:2014 (E). As described in ISO 11608-1:2014 (E), needle-based injection systems may be broadly distinguished into multi-dose container systems and single-dose (with partial or full evacuation) container systems. The container may be a replaceable container or an integrated non-replaceable container.

As further described in ISO 11608-1:2014 (E), a multi-dose container system may involve a needle-based injection device with a replaceable container. In such a system, each container holds multiple doses, the size of which may be fixed or variable (pre-set by the user). Another multi-dose container system may involve a needle-based injection device with an integrated non-replaceable container. In such a system, each container holds multiple doses, the size of which may be fixed or variable (pre-set by the user).

As further described in ISO 11608-1:2014 (E), a single-dose container system may involve a needle-based injection device with a replaceable container. In one example for such a system, each container holds a single dose, whereby the entire deliverable volume is expelled (full evacuation). In a further example, each container holds a single dose, whereby a portion of the deliverable volume is expelled (partial evacuation). As also described in ISO 11608-1:2014 (E), a single-dose container system may involve a needle-based injection device with an integrated non-replaceable container. In one example for such a system, each container holds a single dose, whereby the entire deliverable volume is expelled (full evacuation). In a further example, each container holds a single dose, whereby a portion of the deliverable volume is expelled (partial evacuation).

BRIEF DESCRIPTION OF THE FIGURES

In the following, numerous examples of a vial adapter configured for fastening to an injection vial as well as an injection kit comprising such a vial adapter will become apparent in greater detail by making reference to the drawings, in which.

DETAILED DESCRIPTION

Figure 1:
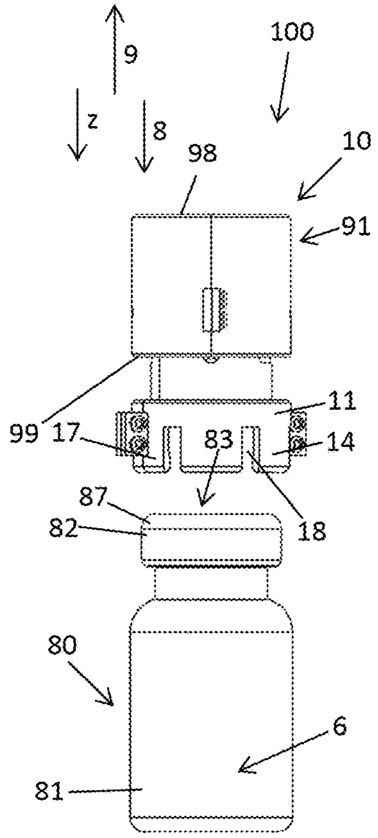
FIG. 1 illustrates an injection kit comprising a vial adapter and an injection vial.

FIGS. 1-11 and 13-17 illustrate an example of a vial adapter 10, which is configured for fastening or engaging with an injection vial 80. The vial adapter 10 fastened or connected to the injection vial 80 may form or constitute an injection kit 100 for administering a liquid substance such as a liquid medicament 6. The injection vial 80 comprises a barrel 81, e.g., of tubular shape. The barrel 81 may comprise a radially stepped down barrel head 82 towards a proximal or upper end. The barrel head 82 comprises or forms an outlet 83, through which a liquid content, e.g., a medicament 6 located inside a cavity 86 of the injection vial 80 can be withdrawn. The outlet 83 is sealed by a pierceable stopper 84. The stopper 84 may comprise a pierceable septum made of a thermoplastic material or elastomeric material, such as bromobutyl rubber. The stopper 84 may be attached and/or fixed to the outlet 83 by way of a crimped cap 87, e.g., made of metal.

The vial adapter 10 comprises an adapter body 11 and a movable part 40, which is longitudinally displaceable relative to the adapter body 11. The adapter body 11 comprises a top wall 12 and a sidewall 14 projecting from an outer edge or outer circumference of the top wall 12 in a longitudinal direction (z) to form a receptacle 15 with a distal side 13 of the top wall 12. Hence, the top wall 12 or adapter body 11 comprises a distal side 13, e.g., facing in a distal direction 8, and comprises an opposite side, e.g., a proximal side 16 facing in a proximal direction 9.

The movable part 40 may comprise a spike 30. The spike 30 may comprise a cannula 54 with a tipped end 55, which is configured to pierce and/or to penetrate the pierceable stopper 84.

In some examples the injection kit 100 is pre-assembled, such that the vial adapter 10 is already fixed to the injection vial 80. In such a pre-assembly configuration the adapter body 11 of the vial adapter 10 may be fastened or fixed to the barrel head 82 of the injection vial 80 without piercing the pierceable seal. Here, the movable part 40 may be in a proximal end position, in which the tipped end 55 of the spike 30 is located outside the pierceable stopper 84 without piercing the stopper 84.

In the pre-assembly configuration it may be then only required that the movable part 40 is moved in the distal direction 8 relative to the adapter body 11 so as to pierce and/or to penetrate the pierceable stopper 84 with the spike 30 or cannula 54.

In other examples, the injection kit 100 comprises the injection vial 80 and the vial adapter 10 as described herein, wherein the vial adapter 10 is wrapped or packaged separately from the injection vial 80. Here, a user equipped with the injection kit 100 may be then initially obliged to connect the adapter body 11 of the vial adapter 10 to the barrel head 82 of the injection vial 80. Thereafter, or concurrent with a fastening of the adapter body 11 to the barrel head 82 the movable part 40 may be subject to a movement in the longitudinal distal direction 8 relative to the adapter body 11 so as to pierce and/or to penetrate the pierceable stopper 84.

The sidewall 14 of the adapter body 11 comprises numerous resiliently deformable sidewall segments 17 that are separated by elongated slits 18 extending in the longitudinal distal direction 8. The slits 18 adjoin a distal end or extend to the distal end of the sidewall 14 such that respective distal ends of the sidewall segments 17 are separated from each other and are thus allowed to flex in radial direction, i.e. transverse or perpendicular to the longitudinal direction (z).

Specifically, the distal ends of the sidewall segments 17 form a skirt 19, which is configured to engage with the barrel head 82 of the injection vial 80. As it is particularly shown in the cross-section of FIG. 8 on an inside surface near the distal end of the sidewall segments 17 there are provided radially inwardly protruding snap features 17*a*, which adjoin a distally facing beveled section 17*b*, which upon a sliding engagement with the barrel head 82 are configured to induce a laterally or radially outwardly directed flexing motion of the individual sidewall segments 17 until the barrel head 82 reaches a final assembly position inside the receptacle 15.

When reaching a final assembly configuration, the sidewall segments 17 and their snap features 17*a* engage with an undercut or recessed section of the barrel head 82 to form a form fitting longitudinal fastening or fixing of the vial adapter 10 to the injection vial 80.

The movable part 40 of the vial adapter 10 comprises a base part 41 and a spike 30, which is long enough to extend through the top wall 12 of the adapter body 11 along the longitudinal direction (z). The spike 30 or cannula 54 comprises a fluid channel 50 with a proximal channel section 52 merging into a mechanical connector 70. The fluid channel 50 further comprises a distal channel section 51 with a channel aperture 53.

Figure 5:
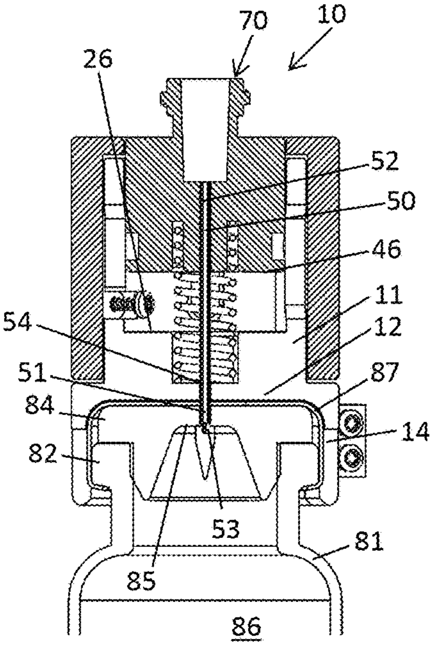
FIG. 5 is a cross-section through the vial adapter fixed to the injection vial according to FIG. 3.
Figure 6:
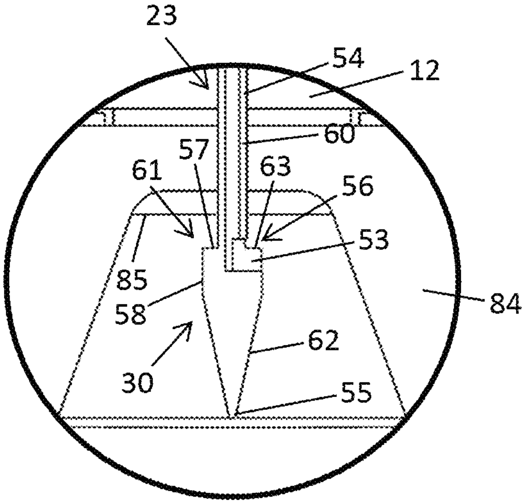
FIG. 6 is an enlarged view of a channel aperture of the movable part in the configuration according to FIGS. 2 and 4.
Figure 7:
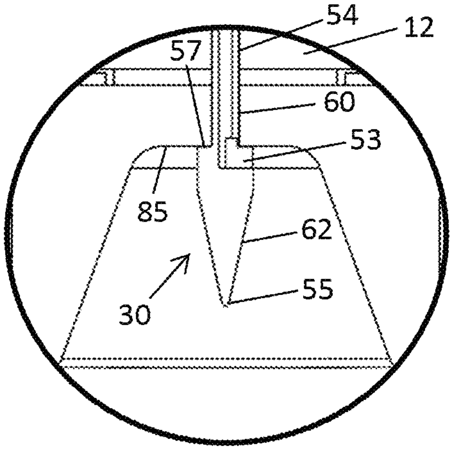
FIG. 7 is an enlarged view of the channel aperture of the movable part in the configuration according to FIGS. 3 and 5.
Figure 8:
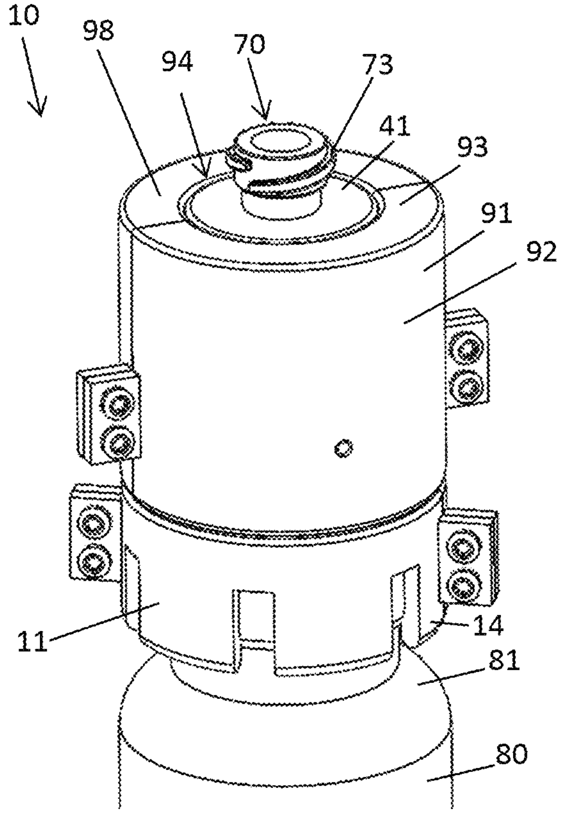
FIG. 8 is a perspective illustration of the injection kit according to FIG. 3.

The movable part 40 is adjustably movable relative to the adapter body 11 along the longitudinal direction (z) to align the channel aperture 53 with an inside surface 85 of the pierceable stopper 84 as illustrated in FIGS. 5 and 7.

Specifically, the movable part 40 is adjustably movable relative to the adapter body 11 to reach an alignment configuration of the channel aperture 53 with the inside surface 85 of the pierceable stopper 84 as shown in FIG. 5. The adjustable displacement of the movable part 40 relative to the adapter body 11 allows and supports a complete or nearly complete withdrawal of the liquid substance from an interior volume of the cavity 86 of the injection vial 80. Moreover, and by way of the individually adjustable longitudinal displacement of the movable part 40 relative to the adapter body 11 there can be provided an effective compensation of manufacturing tolerances and/or assembly tolerances of the injection vial 80, the pierceable stopper 84 and the vial adapter 10 or their mutual assembly.

By adjusting or modifying the longitudinal position of the movable part 40 relative to the adapter body 11 a number of different longitudinal positions of the movable part 40 relative to the adapter body 11 can be obtained in principle. Also, the movable part 40 may be immobilized relative to the adapter body 11 so as to maintain the alignment position of the channel aperture 53 with the inside surface 85 of the pierceable stopper 84.

The elongated and tipped cannula 54 or spike 30 may comprise a rather stiff and compression resistant channel sidewall 60. The spike 30 may extend through the base part 41 of the movable part 40. Here, the base part 41 comprises or forms an insert 43, which is longitudinally displaceable in a guiding structure 20, specifically in a guiding receptacle 21 of the adapter body 11. The guiding structure 20 may comprise a guiding receptacle 21 defining a movement or displacement direction for the movement of the base part 41 relative to the guiding structure 20. The base part 41 may be slidably engageable with the guiding structure 20. It may be slidable relative to the guiding structure 20 in the longitudinal distal direction 8 and in the longitudinal proximal direction 9.

The guiding structure 20 may comprise a guiding receptacle 21, in which the base part 41 is longitudinally guided. The guiding receptacle 21 may be confined or defined by a receptacle sidewall 22. The receptacle sidewall 22 may be of cylindrical shape. It may be open towards the proximal direction 9 and may be confined in the distal direction 8 by a bottom 26.

The base part 41 comprises an outer base part sidewall 42 with an outside surface 45 that is complementary shaped to an inside surface 25 of the receptacle sidewall 22 of the guiding receptacle 21 of the adapter body 11. The receptacle sidewall 22 may protrude proximally from the top wall 12. The receptacle sidewall 22 is of cylindrical shape and protrudes from a transverse midsection of the proximal side 16 of the adapter body 11. The receptacle sidewall 22 may be provided with an inside facing gliding surface 25 to slidably engage with a complementary shaped outside facing gliding surface 45 of the movable part 40. The gliding surface 45 and the gliding surface 25 may be of cylindrical shape to enable a smooth longitudinal sliding or gliding motion of the movable part 40 relative to the adapter body 11.

In a final configuration, e.g., shown in FIGS. 5 and 7, and in which the channel aperture 53 aligns or is flush with the inside surface 85 of the stopper 84, the entire assembly of vial adapter 10 and injection vial 80, may be oriented upside-down to withdraw the liquid content or medicament 6 from the cavity 86 of the injection vial 80. Since the channel aperture 53 is flush or is aligned with the inside surface 85 of the pierceable stopper 84 the entirety of the liquid substance can be withdrawn from the cavity 86 of the injection vial 80.

The top wall 12 may be intersected by a through bore 23 in the longitudinal direction (z). The through bore 23 may be sized and configured to provide a sliding displacement of the spike 30 therethrough in the longitudinal direction (z). Hence, a distal end of the through bore 23 may merge into the receptacle 15. A proximal end of the through bore 23 may merge into the bottom 26 or into a recess 66 provided in the bottom 26.

Figure 13:
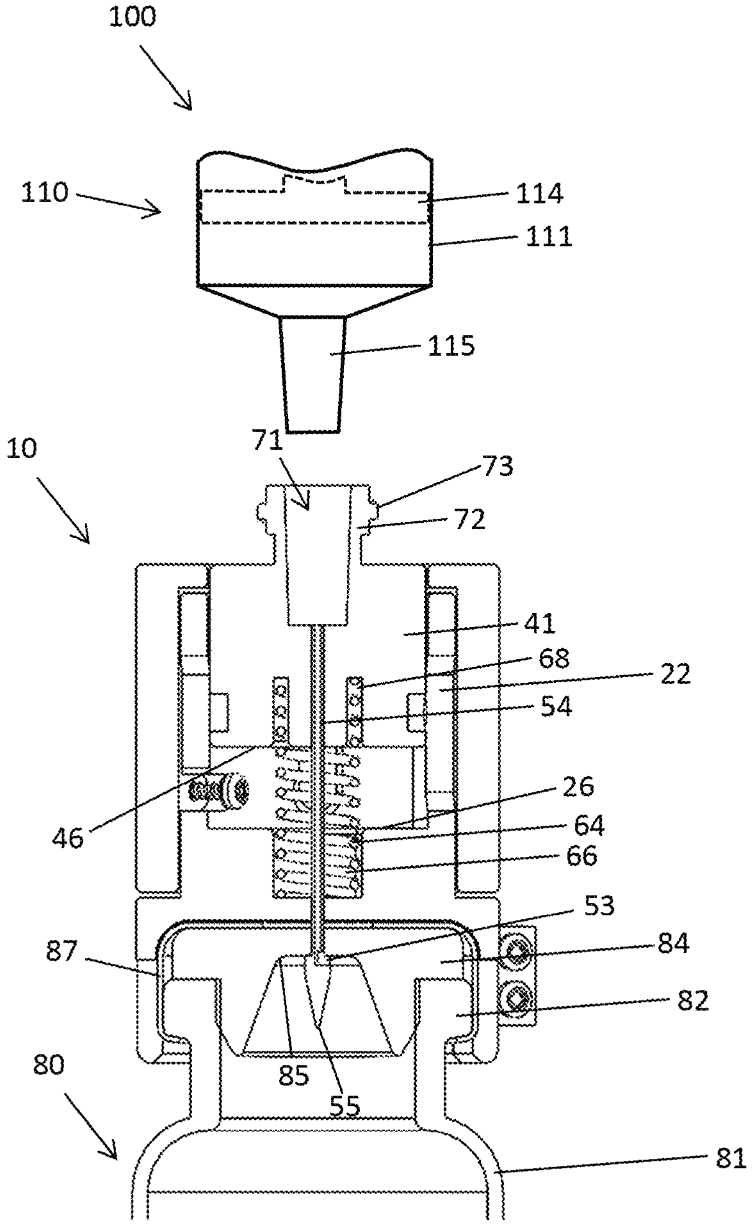
FIG. 13 is another cross section of the assembled injection kit.

The movable part 40 is provided with a mechanical connector 70 at its proximal end, which allows for a liquid transferring coupling or fastening with a fluid transfer device 110, which in the presently illustrated example is implemented as injection device 110, e.g., in form as a syringe 111 as shown in FIG. 13. The mechanical connector 70 comprises a connector sidewall 72 confining a connector receptacle 71. The connector receptacle 71 may be in direct fluid communication with the proximal channel section 52. The connector sidewall 72 may comprise a tapered structure, e.g., configured to engage in a liquid tight or liquid transferring manner with a complementary shaped counter connector 115 of an injection device 110, such as a syringe 111.

The injection device 110 may comprise a syringe barrel 112 in which a plunger 114 is longitudinally movable. The syringe barrel 112 may terminate in the distal direction 8 by the counter connector 115, e.g., implemented as a Luer-type connector and configured to mechanically engage with the inside of the connector sidewall 72 of the mechanical connector 70.

Optionally, the mechanical connector 70 may be provided with a mechanical fastening structure 73. The fastening structure 73 may comprise a threaded portion or threaded section to engage with a complementary shaped counter threaded portion of the injection device 110.

Figure 4:
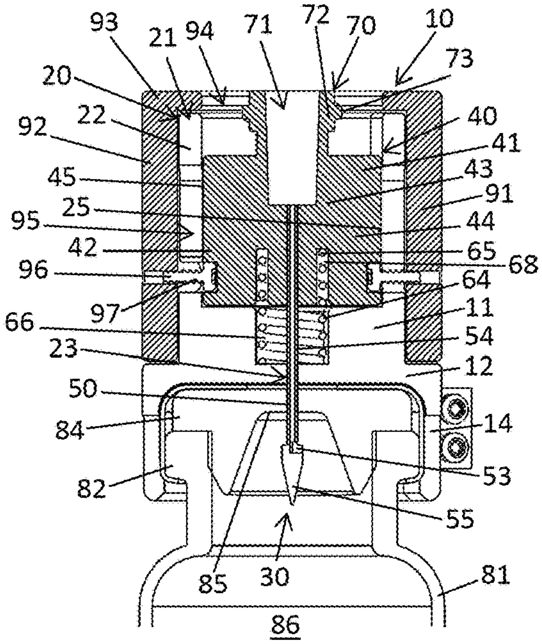
FIG. 4 is a cross-section through the vial adapter fixed to the injection vial according to FIG. 2.

The movable part 40 may be longitudinally displaceable relative to the adapter body 11 between an undeployed position as shown in FIG. 4 and a deployed position as shown in FIG. 5. In the deployed position the mechanical connector 70 may protrude proximally from a proximal end of the adapter body 11. It may be only in the deployed position that the mechanical connector 70 is configured to engage or to connect with the complementary shaped counter connector 115 of the fluid transfer device 110. When and as long as the movable part 40 is in the undeployed position the mechanical connector 70 may be concealed by the adapter body 11, e.g., by the guiding receptacle 21. In the undeployed position a mechanical connection between the mechanical connector 70 and the fluid transfer device 110 may be effectively prevented.

Figure 14:
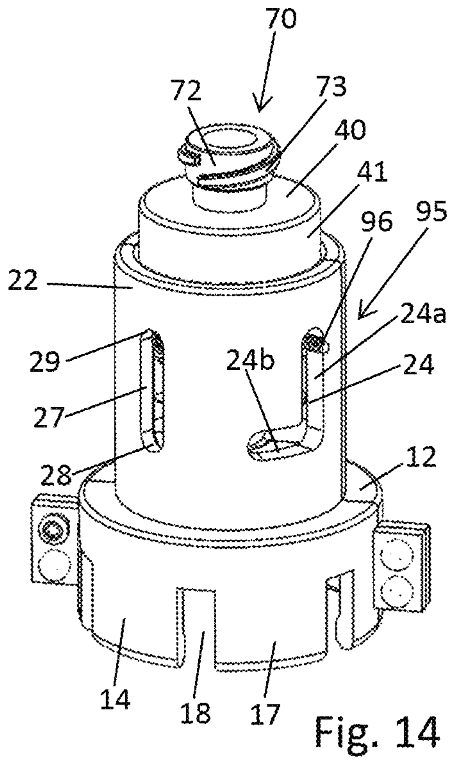
FIG. 14 is a perspective illustration of the vial adapter without the actuating member and with the movable part in the undeployed position.
Figure 15:
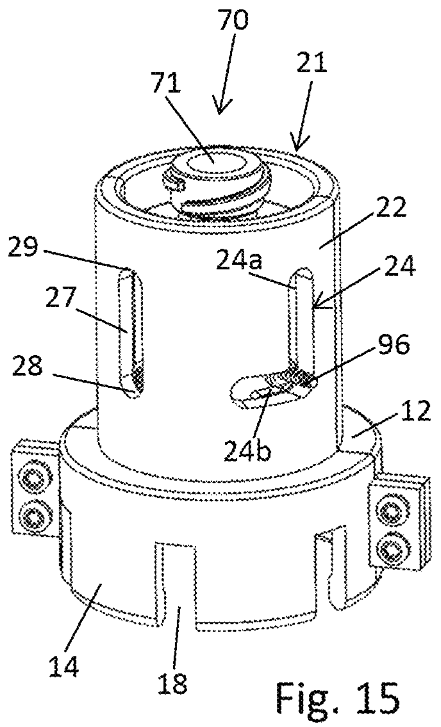
FIG. 15 is a perspective illustration of the vial adapter according to FIG. 14 with the movable part in the deployed position.

As it is particularly shown in FIGS. 14 and 15 the receptacle sidewall 22 is provided with an elongated recess 27, e.g, implemented as a through recess 27 and extending in the longitudinal direction (z). The through recess 27 is delimited in the distal direction 8 by a distal stop face 28 and is delimited in the proximal direction 9 by a proximal stop face 29. The movable part 40, in particular its base part 41 comprises a projection 47 extending laterally or radially into or through the through recess 27.

Figure 10:
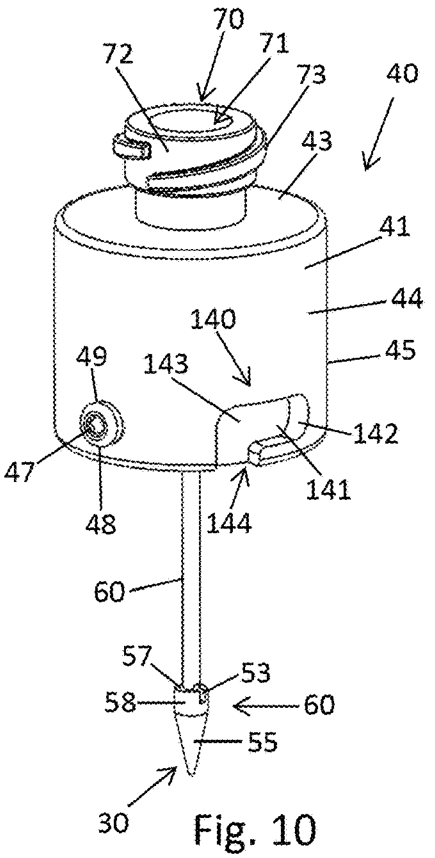
FIG. 10 is an isolated perspective illustration of the movable part of the vial adapter.
Figure 11:
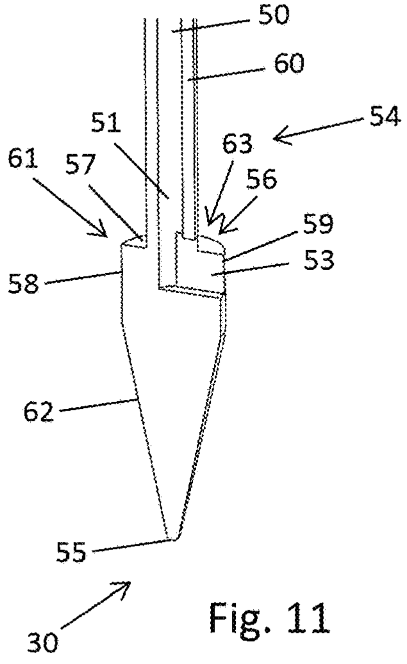
FIG. 11 is an enlarged view of a tipped distal end of a cannula of the movable part.

As shown in FIGS. 10 and 11 the lateral projection 47 comprises a distally facing stop face 48 and a proximally facing stop face 49 to make a respective distally or proximally directed contact with the oppositely located stop faces 28, 29 of the through recess 27, respectively. In this way there is provided a limited longitudinal displacement of the movable part 40 relative to the adapter body 11, which is sufficient to compensate for any manufacturing tolerances or assembly tolerances and which is large enough to obtain or to arrive in an alignment configuration of the channel aperture 53 with the inside surface 85 of the pierceable stopper 84.

By way of the mechanical engagement between the recess 27 and the projection 47 the movable part 40 is rotationally locked to the adapter body 11. It is limited to a longitudinal sliding displacement relative to the adapter body 11.

As it is further apparent from FIG. 5 the guiding receptacle 21 may be delimited in the distal direction 8 by a bottom 26. The movable part 40, specifically its base part 41 comprises a complementary shaped abutment face 46 facing in the distal direction 8. In the configuration of FIG. 4 the abutment face 46 of the movable part 40 is in longitudinal abutment with the bottom 26. In the configuration of FIG. 5 the movable part 40 has been displaced in the proximal direction 9 relative to the guiding receptacle 21. Thus, there is obtained a gap between the abutment face 46 and the bottom 26.

The cannula 54 comprises an elongated tubularly-shaped channel sidewall 60, which confines the fluid channel 50 in circumferential or radial direction. At a distal end of the fluid channel 50 the cannula 54 comprises a radially outwardly protruding channel projection 56. The channel projection 56 is provided with a proximally facing abutment face 57, which is configured to make contact or to abut with the inside surface 85 of the pierceable stopper 84.

At the channel projection 56, there is provided the channel aperture 53, which is in permanent fluid communication with the fluid channel 50.

Figure 9:
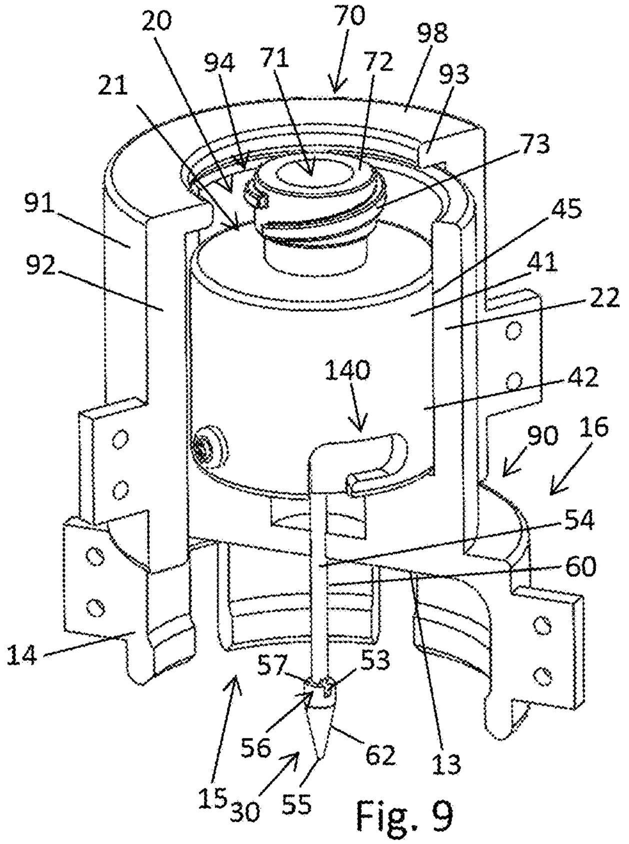
FIG. 9 is a perspective and partial cross-sectional illustration of the vial adapter.

As particularly illustrated in FIGS. 9-11 the channel projection 56 is provided at a proximal end of a radially widened cylindrical section 58 of the spike 30 or cannula 54. The cylindrical section 58 terminates in the proximal direction 9 with a stepped down flange-like abutment face 57, which forms the proximally facing channel projection 56. The abutment face 57 may comprise an annular or circumferential shape. It may be intersected or interrupted by the channel aperture 53, which extends radially from the distal channel section 51 towards and into an outside surface 59 of the cylindrical section 58. The abutment face 57 may form or constitute a stepped section 63 at which the cylindrical section 58 terminates towards the proximal direction 9.

Distally to the cylindrical section 58 there is provided a tapered and hence a beveled section 62 forming the tipped end 55 or terminating in the tipped end 55 of the cannula 54. The distal end section of the spike 30 or cannula 54 is operable to penetrate and to pierce the pierceable stopper 84.

The entire cannula 54 or spike 30 may be made of a single piece. It may be made of a metallic material, e.g., stainless steel. The tipped distal end 55 is particularly configured to cut through or to pierce the pierceable stopper 84.

After having pierced the pierceable stopper 84 to a sufficient degree, e.g., by displacing the movable part 40 relative to the adapter body 11 in the distal direction 8 until the abutment face 46 engages or abuts with the bottom 26 and/or until the stop face 48 abuts with the stop face 28 such that the entire distal end 55 of the cannula 54 has entered the cavity 86 of the barrel 81 there may arise a longitudinal gap or longitudinal distance between the channel projection 56 and the inside surface 85 of the pierceable stopper 84 as, shown in FIG. 4.

By moving the movable part 40 upwardly, i.e. in the proximal direction 9, the channel projection 56 is moved accordingly until its abutment face 57 gets in longitudinal abutment with the inside surface 85 of the pierceable stopper 84. This configuration is schematically illustrated in FIG. 5. The abutment face 57 and hence the channel projection 56 may be then longitudinally aligned with the channel aperture 53. In this way it can be provided that the channel aperture 53 correctly and precisely aligns with the inside surface 85 of the pierceable stopper 84 as soon as an abutment configuration between the abutment face 57 and the inside surface 85 of the pierceable stopper 84 has been reached.

Generally, the channel projection 56 may comprise or may constitute a barb 61 or a barb feature, which is operable to prevent an uncontrolled withdrawal of the cannula out of the cavity 86 and hence through the pierceable stopper 84 in the proximal direction 9.

There is further provided a biasing element 64, which is operably engaged with the adapter body 11 and the movable part 40. The biasing element 64 may be implemented as a helical spring and/or as a compression spring 65. It may be squeezable or biased in the longitudinal direction (z) to store mechanical energy and may release mechanical energy when relaxing and/or dilatating in the longitudinal direction (z).

The biasing element 64 may be configured to urge or to move the movable part 40 in the proximal direction 9 relative to the adapter body 11.

Figure 2:
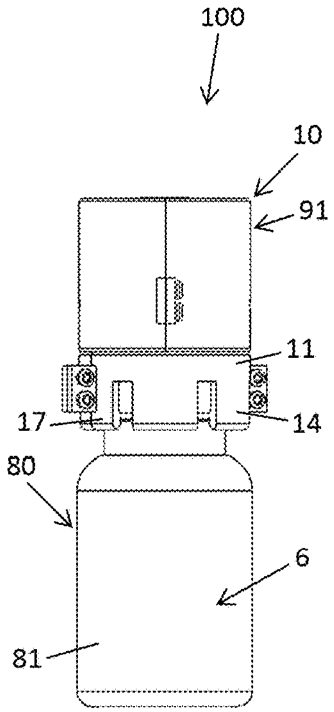
FIG. 2 shows the vial adapter according to FIG. 1 attached to the injection vial and with an actuating member of the vial adapter in an end position.
Figure 3:
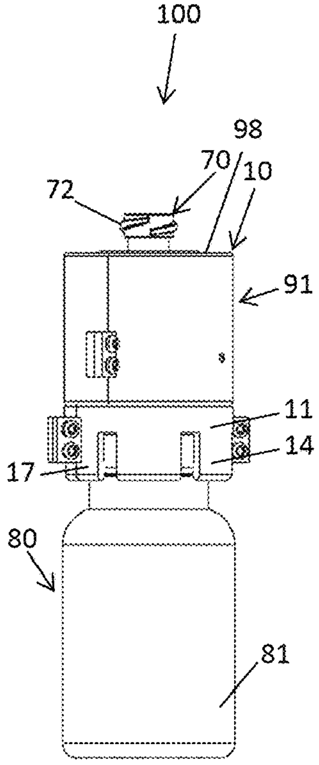
FIG. 3 shows the vial adapter of FIG. 2 with a movable part of the vial adapter in an undeployed position.

In the course of assembly or deployment of the vial adapter 10 with the injection vial 80 the movable part 40 may be depressed manually, e.g., by a user, in the distal direction 8 in order to move the movable part 40 into a distal end configuration as illustrated in FIGS. 2 and 4.

Upon release of the movable part 40, the biasing element 64 may be configured and operable to induce a proximally directed displacement of the movable part 40 relative to the adapter body 11 so as to bring the channel projection 56 and hence the proximally facing abutment face 57 of the cannula 54 in longitudinal abutment with the distally facing inside surface 85 of the pierceable stopper 84.

In some examples the biasing element 64 may be located or arranged between the distally facing abutment face 46 and the proximally facing bottom 26. The biasing element 64 comprises a helical spring 65, which may be in direct longitudinal abutment with the oppositely facing bottom 26 and the abutment face 46, respectively. The spring 65 serves to urge the movable part 40 upwardly, hence in the proximal direction 9.

In an initial configuration and before the vial adapter 10 is mounted or fastened to an injection vial 80 the spring 65 biases the movable part 40 in the proximal direction 9 such that the proximally facing stop face 49 of the projection 47 is in longitudinal abutment with the distally facing stop face 29 of the through recess 27 of the receptacle sidewall 22.

In the presently illustrated example, the biasing element 64 is longitudinally clamped between the distally facing abutment face 46 and the proximally facing bottom 26. For ease of assembly and for providing a well-defined assembly and fixing of the biasing element 64 to at least one of the movable part 40 and the adapter body 11 there may be provided at least one recess 66, 68 for a longitudinal end section of the biasing element 64. As illustrated the bottom 26 comprises a longitudinal recess 66, e.g., in form of a cup-shaped receptacle extending from the bottom 26 in the distal direction 8. The lateral size or transverse cross-section of the recess 66 matches with the outer diameter or transverse cross-section of the distal end of the biasing element 64.

In this way, at least the distal end of the biasing element 64 can be longitudinally received in the recess 66. The through bore 23 of the top wall 12 and hence of the adapter body 11 merges into a central portion of the recess 66. Accordingly, the cannula 54 is guided coaxial with the cylindrically-shaped biasing element 64. The cannula 54 extends longitudinally through the hollow structure of the biasing element 64.

For easy of assembly as well as for providing a well-defined longitudinal engagement or mechanical abutment between the movable part 40 and the biasing element 64 there may be also provided a recess 68 in the abutment face 46 of the movable part 40 and hence of the base part 41 of the movable part 40. The recess 68 may comprise an annular groove sized to receive the proximal end section of the biasing element 64.

In this way, opposite longitudinal ends of the biasing element 64 can be secured and/or fixed to the guiding structure 20 and hence to the bottom 26 as well as to the movable part 40, respectively.

In addition, providing of at least one recess 66, 68 in at least one of the bottom 26 and the abutment face 46 provides and enables a direct longitudinal abutment of the abutment face 46 and the bottom 26. In this way there can be provided a well-defined distal end position or distal stop position for a distally directed movement of the movable part 40 relative to the adapter body 11.

When reaching the distal end position, as illustrated in FIG. 4, at least a radial outer section of the abutment face 46 may completely engage or completely abut with the complementary shaped proximally facing bottom 26. In this way there can be provided a well-defined and tilt-free mutual abutment between the movable part 40 and the adapter body 11.

The spike 30 or cannula 54 may be implemented as a single-pieced metallic part. It may be made of stainless steel. The spike 30 or cannula 54 may be permanently fixed to the base part 41 of the movable part 40. The movable part 40 may consist of the cannula 54 and the base part 41. The base part 41 may be implemented as a plastic component. It may comprise an injection molded plastic component. The base part 41 may be also implemented as a single-pieced or unitarily shaped movable component 40 of the vial adapter 10. The base part 41 may comprise a molded body 44 or may consist of a molded body 44, e.g., an injection molded plastic body 44.

The spike 30 or cannula 54 may be insert molded in the base part 41. This way, there can be provided a mutual fixing between the base part 41 and the spike 30 or cannula 54.

The proximal channel section 52 of the fluid channel 50 as formed or constituted by the cannula 54 merges into the connector receptacle 71, which is provided at the proximal end of the base part 41. In this way, there can be provided a rather direct fluid communication between the fluid channel 50 and the fluid transfer device 110 when duly connected to the mechanical connector 70.

Upon establishing a connection with the injection vial 80 or upon engaging the receptacle 15 of the adapter body 11 with the head 82 of the injection vial 80 the tipped end 55 of the cannula 54 may at least partially penetrate the pierceable stopper 84. During or for mutual engagement of the vial adapter 10 and the injection vial 80 the user may apply a distally directed pressure onto the movable part 40. In other configurations the user may grip the adapter body 11 outside the proximally protruding portion of the movable part 40. Then, the movable part 40 may be located in a proximal end position relative to the adapter body 11 since the biasing element 64 urges the movable part 40 in the proximal direction 9 relative to the adapter body 11 until the abutment face 49 engages the abutment face 29.

The vial adapter 10 further comprises an actuating member 91, which is actuatable by a user. The movable part 40 is located inside the guiding receptacle 21 and may be inaccessible for a user from outside the vial adapter 10. There is further provided a mechanical coupling 90 between the movable part 40 and the actuating member 91 by way of which a user may indirectly induce a movement of the movable part 40 relative to the adapter body 11, namely by moving or actuating the actuating member 91.

The actuating member 91 may comprise an actuating sleeve, e.g., enclosing the receptacle sidewall 22 entirely. As it is immediately apparent from a comparison of FIGS. 1 and 2 as well as from a comparison of FIGS. 17 and 4, the actuating member 91 is movable relative to the adapter body 11 from a start position, which may be a proximal end position, to and into an end position along a first direction (z). The end position may be a distal end position. Here, a distal end 99 of the actuating member 91 may abut with an outside surface of the top wall 12.

Figure 17:
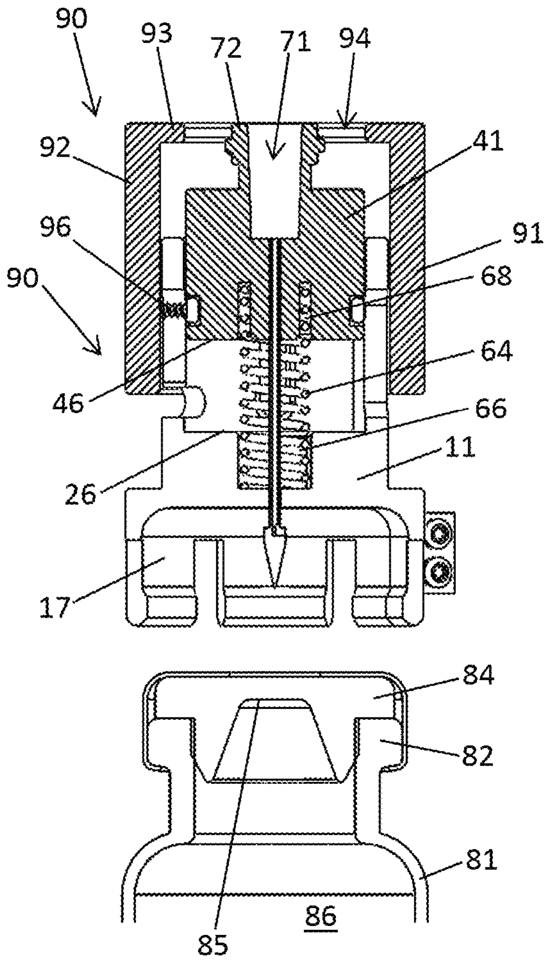
FIG. 17 is a cross-section through the vial adapter and the injection vial before their mutual attachment.

As illustrated in FIG. 9 the actuating member 91 may comprises a tubular sidewall 92. A proximal end 98 of the actuating member 91 comprises a radially inwardly extending flange 93, which surrounds a proximal through opening 94 of the sidewall 92 of the actuating member 91. As it is apparent from FIGS. 4 and 9 the proximal end of the mechanical connector 70 is flush with the proximal end 98 of the actuating member 91. In the start position or stop configuration as shown in FIGS. 1 and 17 the mechanical connector 70 is therefore inaccessible and inoperable for a connection with the counter connector 115 of the fluid transfer device 110.

As it is particularly apparent from FIGS. 14 and 15 the receptacle sidewall 22 of the guiding structure 20 comprises a guiding slot 24 featuring a first slot section 24*a* and a second slot section 24*b*. The first slot section 24*a* extends in the longitudinal direction (z) and defines the first direction along which the actuating member 91 is displaceable or movable relative to the adapter body 11. A longitudinal distal end of the first slot section 24*a* extends and merges into the second slot section 24*b*. The second slot section 24*b* may extend in a circumferential direction. Insofar, the first slot section 24*a* and the second slot section 24*b* may form or constitute the L-shaped guiding slot 24.

The mechanical coupling 90 between the movable part 40 and the actuating member 91 extends through the guiding slot 24. The mechanical coupling 90 may comprise a guiding block or sliding block 96, which is in sliding engagement with the guiding slot 24. The sliding block 96 comprises a projection 97 protruding radially inwardly from the sidewall 92 of the actuating member 91. The guiding slot 24 being in mechanical engagement with the sliding block 96 may form a constitute a slotted guide 95, along which the actuating member 91 is displaceable and movable relative to the adapter body 11.

Figure 16:
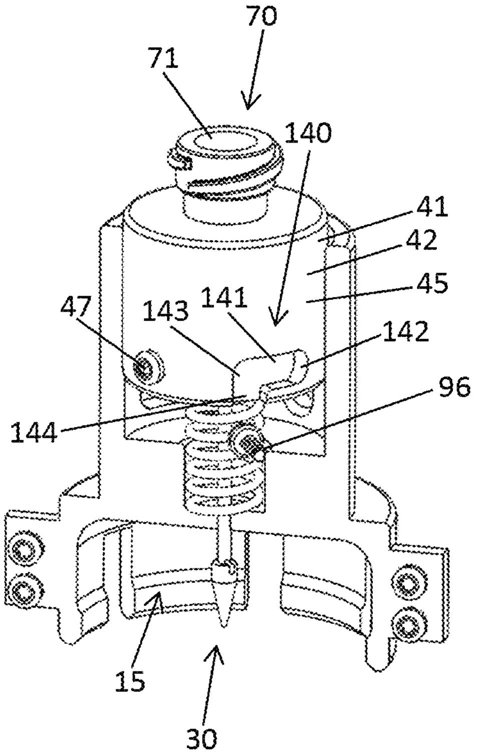
FIG. 16 is another partial section perspective illustration of the vial adapter according to FIGS. 14 and 15 after a release of a mechanical coupling between the movable part and the actuating member (hidden from view)

The sliding block 96 and/or its projection 97 extends radially through the guiding slot 24 and may mechanically engage with a release track 140 provided on the outside surface of the sidewall 42 of the base part 41 of the movable part 40 as shown in FIG. 16.

The release track 140 may be located at or near a distal end of the tubularly-shaped sidewall 42. The release track 140 comprises a first track section 141 merging into a second track section 143. The first track section 141 may extend in the circumferential direction. It may comprise a stop face 142 forming or constituting a dead end of the first track section 141, which is located opposite and hence circumferentially offset from the second track section 143. The second track section 143 merges into that longitudinal end of the first track section 141 that is opposite the stop face 142. The second track section 143 extends in the longitudinal direction (z) into a release opening 144, which merges into the distal end face or abutment face 46 of the base part 41.

In an initial configuration of the vial adapter 10 the movable part 40 is in a proximal end position as shown in FIGS. 14 and 17. Here, the movable part 40 may be longitudinally secured to the adapter body 11 by the longitudinal guiding of the projection 47 in the recess 27. Here, the stop face 29 of the recess 27 may be in longitudinal abutment with the stop face 49 of the projection 47. Additionally, the sliding block 96 reaching or extending through the guiding slot 24 may be located inside the first track section 141 of the release track 140 at or near the stop face 142.

As illustrated in FIG. 14 the sliding block 96 is located inside the first slot section 24*a*. In this initial or start position the actuating member 91 is limited to a longitudinal distally directed sliding displacement by way of which the sliding block 96 and hence the actuating member 91 is moved along the first slot section 24*a* until reaching an end position, as illustrated in FIG. 15, in which the actuating member 91 with its sliding block 96 reaches a distal end of the first slot section 24*a*, which merges circumferentially into the second slot section 24*b*. Hence, when starting from the start position as shown in FIG. 14 the actuating member 91 is limited to a distally directed displacement along the first direction (z) until reaching the end position, in which the sliding block 96 aligns with the second slot section 24*b*.

It may be then that the actuating member 91 is rotatable or movable along a second direction, hence along a circumferential direction with respect to the cylindrical shape of the receptacle sidewall 22. Accordingly, the sliding block 96 is free to enter the second slot section 24*b*. Since the movable part 40 is rotationally fixed to the guiding structure 20 and hence to the receptacle sidewall 22 via the engagement between the projection 47 and the recess 27 the inwardly extending end of the sliding block 96 starts to move along the first in track section 141 towards the second track section 143. When reaching the second track section 143 the sliding block 96 is free to escape from the release track 140 because the second track section 143 merges in the distal direction 8 into the track opening 144 or open end of the second track section 143.

Hence, when reaching the second track section 143, the mechanical coupling 90 between the movable part 40 and the actuating member 91 is released and the movable part 40 is free to move in the proximal direction 9 under the action of the relaxing biasing element 64. Due to the release of the mechanical coupling 90 the movable part 40 is enabled to move in the proximal direction 9 relative to the actuating member 91. When reaching the deployed end position it may then protrude with the mechanical connector 70 from the proximal end 98 of the actuating member 91.

Due to the rotational movement of the actuating member 91 in the circumferential direction with the sliding block 96 gliding or sliding along the second slot section 24*b*, the actuating member 91 is longitudinally locked to the guiding structure 20 and hence to the adapter body 11. Once it has been moved along the second direction (w) it cannot return from this distal end position to the proximal start position. In this way and when the movable part 40 is subject to a proximally directed displacement under the action of the relaxing biasing element 64 the actuating member 91 cannot follow this proximally directed displacement. In this way it can be provided that the movable part 40 is subject to a proximally directed movement relative to the actuating member 91 and relative to the adapter body 11. Finally, when reaching the deployed position, the mechanical connector 70 protrudes proximally from the proximal end 98 of the actuating member 91 and can be connected with the fluid transfer device 110.

In an initial configuration of the vial adapter 10 the actuating member 91 is in the start position as shown in FIGS. 1 and 17. It is also mechanically coupled to the movable part 40, which is also in a proximal end position. During or after duly connecting the vial adapter 10 to the injection vial 80 as illustrated in FIG. 4 the mechanical coupling 90 between the movable part 40 and the actuating member 91 is and remains active and the mechanical connector 70 provided at the proximal end of the movable part 40 is inaccessible for the fluid transfer device 110. Hence and as long as the movable part 40 is in the undeployed position, in which the mechanical connector 70 is concealed or covered by at least one of the receptacle sidewall 22 and the actuating member 91 a fluid transferring connection between the mechanical connector 70 and hence the spike 30 with the fluid transfer device 110 cannot be established.

For transferring the movable part 40 and hence the mechanical connector 70 into the deployed position it is required that the mechanical coupling 90 between the movable part 40 and the actuating member 91 is released or abrogated. This requires a distally directed movement of the actuating member 91 from the start position as shown in FIGS. 1 and 17 into the end position as shown in FIG. 4. Due to the mechanical coupling 90 this distally directed displacement of the actuating member along the first direction (z) from the start position to the end position induces a corresponding distally directed displacement of the movable part 40 relative to the adapter body 11.

Accordingly, also the spike 30 and the distal tipped end 55 of the spike 30 fixed to the base part 41 of the movable part 40 is urged through the pierceable stopper 84 such that the channel aperture 53 is located at a significant distance from the inside surface 85 of the pierceable stopper 84 as shown in FIG. 4.

Upon release of the mechanical coupling 90 the movable part 40 may be then subject to a proximally directed displacement relative to the adapter body 11 under the action of the relaxing biasing element 64 until the channel projection 56 and hence the abutment face 57 of the spike 30 or cannula 54 abuts with the inside surface 85 of the stopper 84 thereby correctly aligning the channel aperture 53 with the inside surface 85.

In this final or alignment configuration the channel aperture 53 may be in a perfect alignment with the inside surface 85 of the pierceable stopper 84. Now, and with an injection device 110 duly attached to the mechanical connector 70 the entire injection kit 100 comprising the vial adapter 10 and the injection vial 80 can be flipped or oriented upside-down by way of which the entirety of a liquid content, e.g., of a liquid medicament 6 located in the cavity 86 of the barrel 81 of the injection vial 80 can be withdrawn through the channel aperture 53 into and through the fluid channel 52 towards the mechanical connector 70 and into the injection device 110.

The proximally directed force emanating from the biasing element 64 is dimensioned or limited to ensure that the channel projection 56 rests against the inside surface 85. The force effect applied by the biasing element 64 onto the movable part 40 in the proximal direction 9 is smaller than a withdrawal force required to detach the spike 30 or cannula 54 with its barb 61 from the pierceable stopper 84.

The mechanical coupling 90 between the movable part 40 and the actuating member, which is only releasable when the actuating member has reached the end position, which may coincide with a distal end position of the movable part, somehow provides a proper piercing or penetration of the stopper 84 by the tipped end 55 of the spike 30. It is only thereafter and upon moving the movable part 40 from the undeployed position into the deployed position as shown in FIG. 5 that the fluid transfer device 110 can be connected to the mechanical connector 70.

When in the distal end position as shown in FIG. 4 there is provided a venting of the cavity 86 of the injection vial 80, which should take place before the mechanical connector 70 is connected to the fluid transfer device 110. Otherwise, and when the cavity 86 should be subject to a negative pressure, withdrawal of a liquid content or medicament from the cavity 86 may be impeded by the negative pressure. Now and by ensuring that the movable part 40 is moved by the actuating member 91 in the distal direction 8 a complete penetration of the stopper 84 will be provided that allows to vent the cavity 86 before the movable part 40 is moved from the undeployed position into the deployed position and before the fluid transfer device 110 is connected to the mechanical connector 70.

Figure 12:
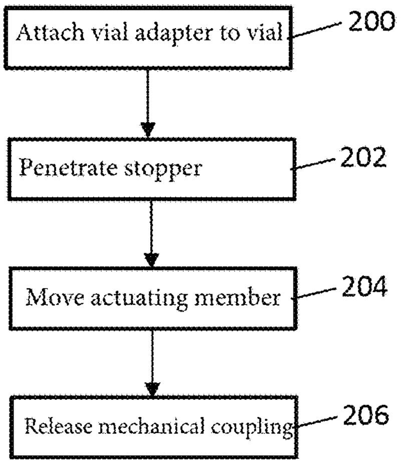
FIG. 12 is a flow chart of a method of withdrawing a liquid medicament contained in an injection vial.

In the flow chart of FIG. 12 the individual steps of using the vial adapter 10 or the injection kit 100 as described herein for withdrawing a liquid medicament contained in an injection vial 80 are schematically described.

In a first step 200 a vial adapter 10 as described herein is attached to a barrel head 82 of an injection vial 80. Concurrently with the engagement of the vial adapter 10 with the barrel head 82 or thereafter in step 202 the pierceable stopper 84 is penetrated in the longitudinal distal direction 8 by the spike 30 or cannula 54.

Thereafter and for completely penetrating the stopper 84 in step 204 the actuating member 91 is moved from its start position, e.g., from a proximal end position, to the end position, e.g., a distal end position along the first direction (z) thereby inducing a distally directed displacement of the movable part 40 relative to the adapter body 11. This distally directed displacement of the movable part 40 and hence of the spike 30 relative to the adapter body 11 provides a respective distally displacement of the channel aperture 53 deeper into the cavity 86 of the barrel 81, such that the channel aperture 53 is located at a significant longitudinal distance distally offset from the inside surface 85 of the stopper 84. In this way and when reaching such an end position the cavity 86 of the barrel 81 can be vented.

In step 206 the mechanical coupling 90 between the movable part 40 and the actuating member 91 is released, e.g., by moving the actuating member 91 along the second direction, e.g., along the circumferential direction as defined by the receptacle sidewall 22. The release of the mechanical coupling 90 may enable a proximally directed displacement of the movable part 40 and hence of the spike 30, e.g., under the action of the relaxing biasing element 64 until the channel projection 56 engages the inside surface 85 of the pierceable stopper 84, thereby perfectly aligning the channel aperture 53 with the inside surface 85.

Thereafter, or concurrently, and in further optional steps the vial adapter 10, can be connected with the fluid transfer device 110 in a fluid transferring way. the entire assembly or kit 100 may be then flipped upside-down for withdrawal of the entirety of the liquid medicament 6 contained inside the cavity 86 of the barrel 81 of the injection vial 80. In this way, a restless emptying of the injection vial 80 can be achieved.

REFERENCE NUMBERS

6 liquid medicament
8 distal direction
9 proximal direction
10 vial adapter
11 adapter body
12 top wall
13 distal side
14 sidewall
15 receptacle
16 proximal side
17 sidewall segment
17*a* snap feature
17*b* beveled section
18 slit
19 skirt
20 guiding structure
21 guiding receptacle
22 receptacle sidewall
23 through bore
24 guiding slot
24*a* slot section
24*b* slot section
25 gliding surface
26 bottom
27 through recess
28 stop face
29 stop face
30 spike
40 movable part
41 base part
42 sidewall
43 insert
44 molded body
45 gliding surface
46 abutment face
47 projection
48 stop face
49 stop face
50 fluid channel
51 channel section
52 channel section
53 channel aperture
54 cannula
55 tipped end
56 channel projection
57 abutment face
58 cylindrical section
59 surface
60 channel sidewall
61 barb
62 beveled section
63 stepped portion
64 biasing element
65 spring
66 recess
68 recess
70 mechanical connector
71 connector receptacle
72 connector sidewall
73 fastening structure
80 injection vial
81 barrel
82 barrel head
83 outlet
84 stopper
85 inside surface
86 cavity
87 crimped cap
90 mechanical coupling
91 actuating member
92 sidewall
93 flange
94 through opening
95 slotted guide
96 sliding block
97 projection
98 proximal end
99 distal end
100 injection kit
110 injection device
111 syringe
112 syringe barrel
114 plunger
115 counter connector
140 release track
141 track section
142 stop face
143 track section
144 opening

The invention claimed is:

1. A vial adapter for connecting to an injection vial that comprises a barrel and a barrel head with an outlet, wherein the outlet is sealed by a pierceable stopper and wherein the pierceable stopper comprises an inside surface, the vial adapter comprising:

an adapter body comprising a top wall and a sidewall projecting from the top wall in a longitudinal direction to form a receptacle with a distal side of the top wall, wherein the receptacle is configured to receive at least a portion of the barrel head;

a movable part comprising a base part and a spike fixed to the base part, wherein the spike extends through the top wall in a distal direction into the receptacle;

an actuating member mechanically coupled to the movable part by a mechanical coupling and movable relative to the adapter body from a start position to an end position along a first direction to induce a distally directed displacement of the movable part relative to the adapter body, wherein the mechanical coupling between the movable part and the actuating member is releasable when the actuating member is in the end position;

wherein the actuating member is actuatable by a user; and wherein the mechanical coupling between the movable part and the actuating member remains intact when the movable part is located offset from the end position.

2. The vial adapter according to claim 1, wherein the actuating member is movable relative to the adapter body along a second direction to release the mechanical coupling between the movable part and the actuating member.

3. The vial adapter according to claim 1, comprising a biasing element operably engaged with the adapter body and the movable part and configured to apply a biasing force between the adapter body and the movable part to displace the movable part from an undeployed position towards a deployed position.

4. The vial adapter according to claim 3, wherein the movable part is movable under an action of the biasing element when the mechanical coupling between the movable part and the actuating member is released.

5. The vial adapter according to claim 1, wherein the spike comprises:

an elongated fluid channel;

a tipped distal end configured to penetrate the pierceable stopper; and a channel aperture in fluid communication with the fluid channel, wherein the movable part is adjustably movable relative to the adapter body along the longitudinal direction to align the channel aperture with the inside surface of the pierceable stopper.

6. The vial adapter according to claim 5, wherein the spike comprises an elongated channel sidewall confining the fluid channel and further comprising a channel projection protruding laterally from the elongated channel sidewall and comprising a proximally facing abutment face to abut longitudinally with the inside surface of the pierceable stopper.

7. The vial adapter according to claim 6, wherein the channel projection is longitudinally aligned with the channel aperture.

8. The vial adapter according to claim 1, wherein the adapter body comprises a longitudinally extending guiding structure along which the movable part is movably guided in the longitudinal direction.

9. The vial adapter according to claim 8, wherein the guiding structure comprises a guiding slot with a first slot section and a second slot section merging into the first slot section, wherein the first slot section extends parallel to the first direction.

10. The vial adapter according to claim 9, wherein the actuating member is mechanically coupled to the movable part via a sliding block extending through the guiding slot.

11. The vial adapter according to claim 10, wherein the movable part comprises a release track with a first track section and a second track section, and wherein the sliding block fixed to the actuating member is guided in the release track.

12. The vial adapter according to claim 11, wherein the second track section comprises an opening at an end section facing away from the first track section, and wherein the mechanical coupling between the movable part and the actuating member is releasable by moving the sliding block fixed to the actuating member along the first track section into the second track section, wherein the sliding block is allowed to escape from the release track at the second track section.

13. An injection kit for administering a liquid medicament, the injection kit comprising:

an injection vial comprising:

a barrel to accommodate a liquid medicament; and a barrel head with an outlet that is sealed by a pierceable stopper, wherein the pierceable stopper comprises an inside surface; and a vial adapter comprising:

an adapter body comprising a top wall and a sidewall projecting from the top wall in a longitudinal direction to form a receptacle with a distal side of the top wall, wherein the receptacle is configured to receive at least a portion of the barrel head;

a movable part comprising a base part and a spike fixed to the base part, wherein the spike extends through the top wall in a distal direction into the receptacle; and an actuating member mechanically coupled to the movable part by a mechanical coupling and movable relative to the adapter body from a start position to an end position along a first direction to induce a distally directed displacement of the movable part relative to the adapter body, wherein the mechanical coupling between the movable part and the actuating member (i) remains intact when the movable part is located offset from the end position and (ii) is releasable when the actuating member is in the end position, and wherein the actuating member is actuatable by a user.

14. A method of withdrawing a liquid medicament contained in an injection vial, the method comprising:

engaging a vial adapter with a barrel head of the injection vial, wherein the vial adapter comprises an adapter body, a movable part, an actuating member, and a mechanical coupling between the movable part and the actuating member, the movable part comprising a spike;

penetrating a pierceable stopper of the injection vial in a longitudinal distal direction with the spike, wherein the pierceable stopper seals an outlet of a barrel of the injection vial;

moving the actuating member from a start position to an end position along a first direction to induce a distally directed displacement of the movable part relative to the adapter body, wherein the mechanical coupling between the movable part and the actuating member remains intact when the movable part is located offset from the end position; and releasing the mechanical coupling between the movable part and the actuating member.

15. A method of administering an injectable medicament from an injection vial, the method comprising:

using a vial adapter for connecting to an injection vial;

wherein the injection vial comprises:

a barrel; and a barrel head with an outlet that is sealed by a pierceable stopper, wherein the pierceable stopper comprises an inside surface; and wherein the vial adapter comprises:

an adapter body comprising a top wall and a sidewall projecting from the top wall in a longitudinal direction to form a receptacle with a distal side of the top wall, wherein the receptacle is configured to receive at least a portion of the barrel head;

a movable part comprising a base part and a spike fixed to the base part, wherein the spike extends through the top wall in a distal direction into the receptacle;

an actuating member mechanically coupled to the movable part by a mechanical coupling and movable relative to the adapter body from a start position to an end position along a first direction to induce a distally directed displacement of the movable part relative to the adapter body, wherein the actuating member is actuatable by a user, and wherein the mechanical coupling between the movable part and the actuating member (i) remains intact when the movable part is located offset from the end position and (ii) is releasable when the actuating member is in the end position.

* * * * *